US008555255B2

(12) United States Patent
Odaira et al.

(10) Patent No.: US 8,555,255 B2
(45) Date of Patent: Oct. 8, 2013

(54) METHOD OF TRACING OBJECT ALLOCATION SITE IN PROGRAM, AS WELL AS COMPUTER SYSTEM AND COMPUTER PROGRAM THEREFOR

(75) Inventors: Rei Odaira, Kanagawa (JP); Kazunori Ogata, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 12/715,703

(22) Filed: Mar. 2, 2010

(65) Prior Publication Data
US 2010/0229159 A1 Sep. 9, 2010

(30) Foreign Application Priority Data

Mar. 3, 2009 (JP) .................................. 2009-49727

(51) Int. Cl.
*G06F 9/44* (2006.01)
(52) U.S. Cl.
USPC ........... 717/128; 717/127; 717/129; 717/130; 717/131; 717/132; 717/133
(58) Field of Classification Search
None
See application file for complete search history.

(56) References Cited

U.S. PATENT DOCUMENTS

| 6,047,283 | A  | * | 4/2000 | Braun ................................... | 1/1 |
| 6,799,191 | B2 | * | 9/2004 | Agesen et al. ......................... | 1/1 |
| 6,839,725 | B2 | * | 1/2005 | Agesen et al. ......................... | 1/1 |
| 7,103,181 | B2 | * | 9/2006 | Ananth ........................... | 380/37 |
| 7,313,661 | B1 | * | 12/2007 | Dmitriev ....................... | 711/159 |
| 7,325,106 | B1 | * | 1/2008 | Dmitriev et al. ................ | 711/159 |
| 7,596,667 | B1 | * | 9/2009 | Detlefs et al. ................. | 711/159 |
| 7,606,989 | B1 | * | 10/2009 | Detlefs et al. ................. | 711/159 |
| 7,676,511 | B2 | * | 3/2010 | Printezis et al. ............... | 707/813 |
| 7,827,538 | B2 | * | 11/2010 | Trotter ......................... | 717/127 |

(Continued)

FOREIGN PATENT DOCUMENTS

| JP | 08-314752 A | 11/1996 |
| JP | 2002-055852 A | 2/2002 |

(Continued)

OTHER PUBLICATIONS

"Differential Register Allocation" by Xiaotong Zhuang and Santosh Pande, PLDI'05, Jun. 12-15, 2005) Chicago Illinois, USA.*

(Continued)

*Primary Examiner* — Henry Tsai
*Assistant Examiner* — Jing-Yih Shyu
(74) *Attorney, Agent, or Firm* — Jeffrey N. Giunta; Fleit Gibbons Gutman Bongini & Bianco PL

(57) ABSTRACT

A data structure of a run-time object having a hash value field. The data structure allows an object allocation site to be traced from the run-time object, the object allocation site being a site in a program allocating the run-time object. A method for allowing an object allocation site to be traced from a run-time object includes embedding a value corresponding to the object allocation site in the program. A hash-value field includes the embedded value and the object identifier, and the tracing is performed by identifying the object allocation site that corresponds to the embedded value. A computer system for tracing an object allocation site includes a memory that stores the run-time object; an acquirer that acquires the value from a hash value field; and an identification unit that identifies the object allocation site that corresponds to the acquired value.

17 Claims, 27 Drawing Sheets

(56) References Cited

U.S. PATENT DOCUMENTS

| | | | |
|---|---|---|---|
| 7,904,493 B2* | 3/2011 | Schmelter et al. | 707/820 |
| 7,926,043 B2* | 4/2011 | Vaswani et al. | 717/130 |
| 8,037,477 B2* | 10/2011 | Findeisen et al. | 718/104 |
| 2001/0044856 A1* | 11/2001 | Agesen et al. | 709/315 |
| 2002/0019716 A1* | 2/2002 | Agesen et al. | 702/83 |
| 2005/0091646 A1* | 4/2005 | Chilimbi et al. | 717/130 |
| 2005/0114844 A1* | 5/2005 | Betancourt et al. | 717/128 |
| 2006/0248195 A1* | 11/2006 | Toumura et al. | 709/226 |
| 2006/0291650 A1* | 12/2006 | Ananth | 380/46 |
| 2007/0011216 A1* | 1/2007 | Doi et al. | 707/206 |
| 2007/0027942 A1* | 2/2007 | Trotter | 707/205 |
| 2007/0180002 A1* | 8/2007 | Printezis et al. | 707/206 |
| 2008/0005208 A1* | 1/2008 | Vaswani et al. | 707/206 |
| 2008/0127212 A1* | 5/2008 | Nakamizo et al. | 719/315 |

FOREIGN PATENT DOCUMENTS

| | | |
|---|---|---|
| JP | 2006-350876 A | 12/2006 |
| JP | 2008-134709 | 6/2008 |
| JP | 2008-191907 A | 8/2008 |

OTHER PUBLICATIONS

K. Russell, et al., "Eliminating Synchronization-Related Atomic . . . Rebiasing", In Proceedings of the ACM SIGPLAN 2006, Conference on Object-Oriented Programing, pp. 263-272.

R. Shaham, et al., "Heap Profiling for Space-Efficient Java", In Proceedings of the ACM SIGPLAN 2001, Conference of Programing Language. ., pp. 104-113.

* cited by examiner

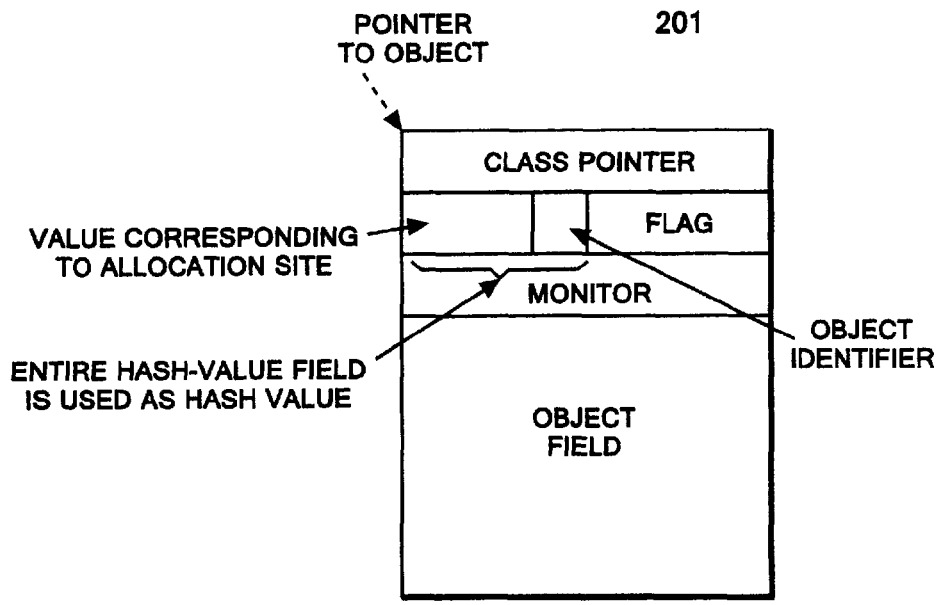
FIG. 2A
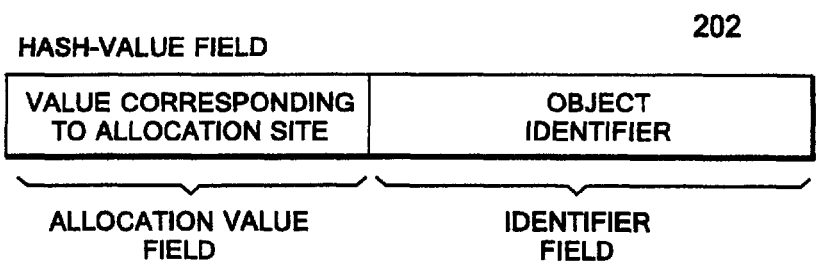
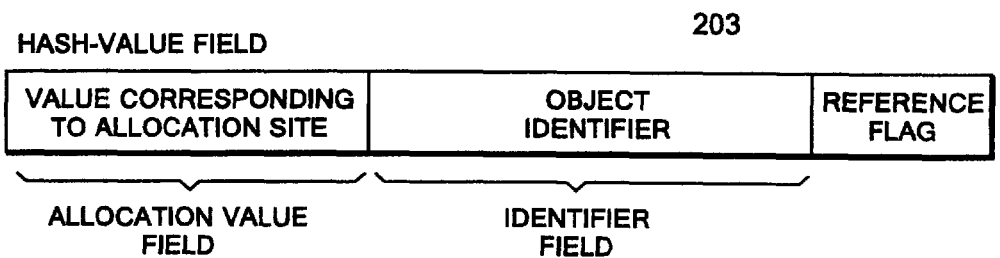
FIG. 2B

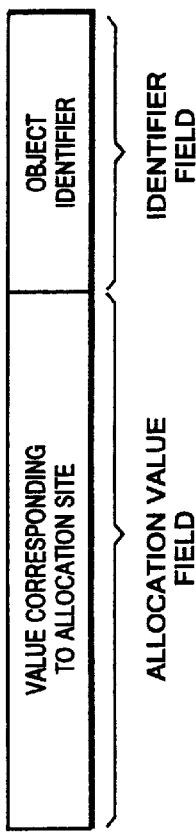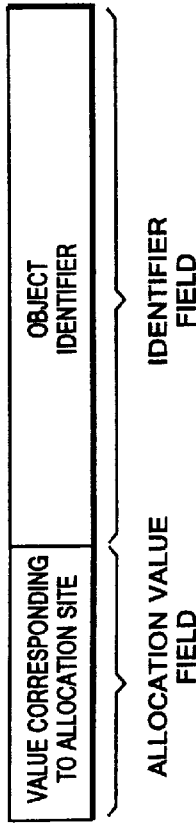
FIG. 3

```
const int HASH_OFFSET = 18; /* OFFSET WITHIN WORD FOR HASH VALUE */
const int HASH_REFERRED_BIT = 0x20000; /* 18TH BIT IS USED FOR FLAG INDICATING
WHETHER HASH VALUE HAS BEEN REFERRED TO OR NOT */
const int HASH_WORD_LENGTH = 14; /* BIT LENGTH OF HASH VALUE */
const int HASH_WORD_CLEAR_MASK = 0x3FFFF; /* CLEAR_MASK FOR HASH VALUE */
const int RANDOM_VALUE_MIN_LENGTH = 4; /* MINIMUM BIT LENGTH FOR OBJECT IDENTIFIER */
const int RANDOM_VALUE_MAX_LENGTH = 14; /* MAXMUM BIT LENGTH FOR OBJECT IDENTIFIER */
/* MAXMUM BIT LENGTH FOR VALUE (DYNAMIC VALUE) */
const int DYNAMIC_ID_MAX_LENGTH = HASH_WORD_LENGTH - RANDOM_VALUE_MIN_LENGTH;
/* BIT MASK FOR OBJECT IDENTIFIER */
static const int RANDOM_VALUE_MASK [15] =
{ 0, 0x1, 0x3, 0x7, 0xF, 0x1F, 0x3F, 0x7F, 0xFF, 0x1FF, 0x3FF, 0x7FF, 0xFFF, 0x1FFF, 0x3FFF };
```

OBJECT STRUCTURE ⎧802

```
struct object type {
  /* object header */
  struct class_type *clazz;
  volatile unsigned int hash_flag_word;
  unsigned int monitor_word;
  /* object fields */
  ...
};
```

INFORMATION ON EACH ALLOCATION SITE ⎧803

```
struct alloc_site_info_type {
  int dynamic_ID;           /* VALUE (DYNAMIC VALUE) CURRENTLY ALLOCATED.
                               INITIAL VALUE IS CLASS_HASH OF CORRESPONDING CLASS */
  volatile int random_value_mask;  /* CURRENT BIT MASK OF OBJECT IDENTIFIER.
                                      INITIAL VALUE IS 0 */
  int random_value_length;  /* CURRENT BIT LENGTH OF OBJECT IDENTIFIER.
                               INITIAL VALUE IS RANDOM_VALUE_MIN_LENGTH - 1 */
  volatile bool full;       /* FLAG INDICATING THAT NEW VALUE (DYNAMIC NUMBER)
                               CANNOT BE ALLOCATED TO THIS ALLOCATION SITE. INITIAL VALUE IS false */
  /* OTHER INFORMATION INDICATING ALLOCATION SITE, SUCH AS CLASS NAME,
     METHOD NAME, BYTECODE OFFSET */
};
```

FIG. 8B

NODE STRUCTURE OF BINARY TREE ⟨804

```
struct dynamic_ID_node_type {
    int static_ID;  /* CORRESPONDING STATIC NUMBER */
    int dynamic_ID;  /* VALUE (DYNAMIC NUMBER) OF THIS NODE */
    int height;  /* HEIGHT OF THIS NODE IN TREE */
    struct dynamic_ID_node_type *zero_child;  /* CHILD NODE ON "0" SIDE */
    struct dynamic_ID_node_type *one_child;  /* CHILD NODE ON "1" SIDE */
    struct dynamic_ID_node_type *parent;  /* PARENT NODE */
};
```

STRUCTURE FOR EACH CLASS, FOR MANAGING BINARY TREE ⟨805

```
struct class_dynamic_info_type {
    int CLASS_HASH;  /* CONSTANT NUMBER FOR HASH_WORD_LENGTH SET RANDOMLY
                        FOR EACH CLASS, SUCH AS PART OF ADDRESS FOR Class OBJECT,
                        FOR EXAMPLE */
    mutex_lock_type lock;  /* LOCK FOR EXCLUSIVE CONTROL OF BINARY TREE UPDATE */
    dynamic_ID_node_type *root;  /* INDICATE ROOT OF BINARY TREE. INITIAL VALUE IS NULL */
};
```

FIG. 8C

```
int hashCode (object_type *this) {
RETRY:
    unsigned int old_hash_flag_word = this->hash_flag_word;
    if (old_hash_flag_word & HASH REFERRED_BIT) {
        /* HASH VALUE OF THIS OBJECT HAS BEEN REFERRED TO BEFORE,
        AND CORRECT HASH VALUE IS SET IN HEADER */
        return old_hash_flag_word >> HASH_OFFSET;
    } else {
        /* HASH VALUE OF THIS OBJECT HAS BEEN REFERRED
        TO FOR THE FIRST TIME */
        int static_ID = old_hash_flag_word >> HASH_OFFSET;  /* VALUE(STATIC NUMBER) */
        /* OBTAIN STRUCTURE OF ALLOCATION-SITE INFORMATION
        FROM CLASS IDENTIFIER AND VALUE (STATIC NUMBER)
         get_alloc_site_info() DESIRABLY EMPLOYS ALGORITHM IN WHICH LOCK IS HELD
        AS RARELY AS POSSIBLE */
        alloc_site_info_type *sinfo = get_alloc_site_info(this->clazz, static_ID);
        /* OBTAIN OBJECT IDENTIFIER. IN TYPICAL IMPLEMENTATION,
        PART OF BITS FOR ADDRESS FOR this IS USED. */
        new_hash_flag_word = get_random_value (this) ;
        /* MASK BY CURRENT BIT LENGTH OF OBJECT IDENTIFIER */
        int local_random_value_mask = sinfo->random_value_mask;
        new_hash_flag_word &= local_random_value_mask;
        int random_value = new_hash_flag_word; /* MAKE COPY TO USE IT LATER */
        /* SET VALUE (DYNAMIC NUMBER) */
        new_hash_flag_word |= sinfo->dynamic_ID;
        int return_hash_code = new_hash_flag_word;  /* RETURNED VALUE OF
                                                       THIS FUNCTION */
        /* SET FLAG INDICATING THAT HASH VALUE HAS BEEN REFERRED TO */
        new_hash_flag_word <<= HASH_OFFSET;
        new_hash_flag_word |= HASH_REFERRED_BIT;
        /* SET VALUES IN WORD, EXCEPT FOR HASH VALUE */
        new_hash_flag_word |= old_hash_flag_word & HASH_WORD_CLEAR_MASK;
        /* ALL BITS OF RANDOM VALUE BECOME ZERO WITH CERTAIN PROBABILITY
        ALL BITS ARE CHECKED HERE, BUT ONLY PART OF BITS MAY BE CHECKED
        BY MASKING */
        if (random_value == 0) {
            if (!sinfo->full) {
                /* REDUCE BIT LENGTH FOR VALUE (DYNAMIC NUMBER) =
                EXPAND BIT LENGTH FOR OBJECT IDENTIFIER
                WHEN NO VALUE (DYNAMIC NUMBER) HAS BEEN ALLOCATED YET
                TO THIS ALLOCATION SITE, random_value_mask == 0 AND full == false,
                SO THAT EXECUTION HERE IS ALWAYS PERFORMED */
                /* OBTAIN STRUCTURE FOR MANAGING BINARY TREE FOR EACH CLASS */
                class_dynamic_info_type *dinfo = get_class_dynaMic_info (this->claZz) ;
                /* HOLD LOCK FOR EACH CLASS. STRICTLY, COMPETITION OCCURS
                IF LOCK HAS NOT BEEN HELD SINCE REFERENCE OF VARIOUS FIELDS
                IN sinfo AVOVE, BUT IN THIS IMPLEMENTATION EXAMPLE,
                LOCK IS HELD AS RARELY AS POSSIBLE TO TAKE FASTEST PATH
                FOR SPEED INCREASE
                IF COMPETITION OCCURS, VALUE BEING NOT CORRECT AS VALUE
                (DYNAMIC NUMBER) MIGHT BE SET, BUT THIS DOES NOT AFFECT
                EXECUTION CORRECTNESS */
                mutex_lock (dinfo->lock);
                /* CHECK WHETHER COMPETING ANOTHER THREAD ALREADY EXPANDED
                BIT LENGTH OF OBJECT IDENTIFIER */
```

FIG. 8D

```
if (!sinfo->full && local_random_value_mask == sinfo->random_value_mask) {
        /* THERE IS NO COMPETING THREAD */
        if (dinfo->root == NULL)
            /* INITIATE BINARY TREE */
            initialize_dynamic_info(dinfo) ;
    bool success;
    /* IF NO VALUE (DYNAMIC NUMBER) HAS BEEN ALLOCATED YET TO
        THIS ALLOCATION SITE, first_time == true */
    bool first_time = sinfo->random_value_mask == 0 ? true : false;
    if (sinfo->random_value_value_length < RANDOM_VALUE_MAX_LENGTH) {
    /* THERE IS ROOM FOR EXPANDING BIT LENGTH FOR OBJECT IDENTIFIER
    sinfo->random_value_length++ ;
    /* SEARCH FOR NEW VALUE (DYNAMIC NUMBER) */
    success = search_for_next_dynamic_ID(sinfo, dinfo) ;
    if (!success && sinfo->random_value_length > RANDOM_VALUE_MIN_LENGTH) {
    /* IF NEW VALUE (DYNAMIC NUMBER) CANNOT BE ALLOCATED,
    TRY WITH ORIGINAL BIT LENGTH OF OBJECT IDENTIFIER */
            sinfo->random_value_length--;
            succcess = search_for_next_dynamic_ID(sinfo, dinfo) ;
        }
    } else
        /* IF BIT LENGTH OF OBJECT IDENTIFIER CANNOT BE EXPANDED,
        SEARCH FOR NEW VALUE (DYNAMIC NUMBER) WITH CURRENT BIT LENGTH */
            success = search_for_next_dynamic_ID(sinfo, dinfo) ;
    if (!success)
        /* IF NEW VALUE (DYNAMIC NUMBER) CANNOT BE ALLOCATED,
        HEAP SPACE MAY BE SCANNED TO COLLECT VALUE (DYNAMIC NUMBER)
        HAVING NO LIVE OBJECTS AND TO REUSE IT.
        IN THIS IMPLEMENTATION EXAMPLE, full BIT IS SIMPLY SET AND
        CURRENT VALUE (DYNAMIC NUMBER) IS CONTINUOUSLY USED */
            sinfo->full = true;
        if (first_time) {
            /* WHEN NO VALUE (DYNAMIC NUMBER) HAS BEEN ALLOCATED YET
            TO THIS ALLOCATION SITE, VALUE (DYNAMIC NUMBER) HAS TO BE SET
            CORRECTLY IN new_hash_flag_word.
            EVEN THOUGH NO VALUE (DYNAMIC NUMBER) HAS BEEN ALLOCATED YET
            TO THIS ALLOCATION SITE, IF NEW VALUE (DYNAMIC NUMBER) CANNOT BE
            ALLOCATED ANY MORE TO ALLOCATION SITE OF THIS CLASS,
            HEAP SPACE MAY BE SCANNED TO COLLECT VALUE (DYNAMIC NUMBER)
            AND TO REUSE IT.
            KNOWING RISK OF AMBIGUITY, VALUE (DYNAMIC NUMBER) BEING ALREADY
            USED MAY BE USED */
            new_hash_flag_word &= HASH_WORD_CLEAR_MASK;
            if (success) {
                return_hash_code = sinfo->dynamic_ID;
                new_hash_flag_word |= return_hash_code << HASH_OFFSET;
            } else {
                /* RANDOM VALUE (DYNAMIC NUMBER) IS USED IN
                    THIS IMPLEMENTATION EXAMPLE */
                return_hash_code = get_random_value(this) &
                                    RANDOM_VALUE_MASK[HASH_WORD_LENGTH] ;
                new_hash_flag_word |= return_hash_code << HASH_OFFSET;
                sinfo->random_value_mask =
        RANDOM_VALUE_MASK[HASH_WORD_LENGTH] ;
```

FIG. 8E

```
        }
                }
            }
            mutex_unlock(dinfo->lock) ;
        }
    }
    /* ATTEMPT TO WRITE INTO HEADER ATOMICALLY */
    if (COMPARE_AND_AWAP(&this->hash_flag_word, old_hash_flag_word,
new_hash_flag_word)
        == FAILURE)
        goto RETRY;
    return return_hash_code;
    }
}
```

FIG. 8F

| ADDRESS OF RUN-TIME OBJECT | ALLOCATION SITE |
|---|---|
| 0x00200130 | METHOD meth1, LINE NUMBER 15 |
| 0x002001c8 | METHOD meth2, LINE NUMBER 128 |
| 0x002001f0 | METHOD meth1, LINE NUMBER 28 |
| 0x00200204 | METHOD meth2, LINE NUMBER 128 |
| 0x00200220 | METHOD meth2, LINE NUMBER 128 |
| 0x00200248 | METHOD meth2, LINE NUMBER 128 |
| 0x00200274 | METHOD meth1, LINE NUMBER 15 |
| 0x00200298 | METHOD meth2, LINE NUMBER 128 |
| 0x002002c0 | METHOD meth2, LINE NUMBER 128 |
| 0x002002d8 | METHOD meth2, LINE NUMBER 128 |
| 0x00200304 | METHOD meth1, LINE NUMBER 15 |
| 0x00200324 | METHOD meth2, LINE NUMBER 128 |
| 0x00200350 | METHOD meth2, LINE NUMBER 128 |
| 0x00200374 | METHOD meth2, LINE NUMBER 128 |
| 0x00200398 | METHOD meth2, LINE NUMBER 128 |
| 0x002003b4 | METHOD meth3, LINE NUMBER 32 |
| 0x002003f0 | METHOD meth2, LINE NUMBER 128 |
| 0x00200440 | METHOD meth2, LINE NUMBER 128 |

FIG. 10

|   | Trade 6 | | SPECjbb2005 | |
|---|---|---|---|---|
| 1 | [Ljava/lang/Object; | 14933 | [Ljava/lang/Object; | 607 |
| 2 | [Ljava/lang/String; | 2299 | [I | 356 |
| 3 | Ljava/lang/StringBuffer; | 1547 | [Ljava/lang/String; | 323 |
| 4 | Ljava/util/HashMap; | 1045 | Ljava/lang/StringBuffer; | 315 |
| 5 | Ljava/lang/String; | 790 | Lcom/ibm/security/ObjectIdentifier; | 112 |
| 6 | Ljava/util/ArryList; | 761 | [B | 98 |
| 7 | [I | 565 | [C | 88 |
| 8 | Lcom/ibm/webshere/pmi/PmiDataInfo; | 458 | Ljava/lang/String; | 66 |
| 9 | Ljava/lang/Integer; | 448 | Ljava/lang/HashMap; | 54 |
| 10 | [C | 392 | Ljava/lang/StringBuffer; | 48 |

FIG. 11

|   | Trade 6 | | SPECjbb2005 | |
|---|---|---|---|---|
|   | MEAN NUMBER OF COLLISIONS | MAXIMUM NUMBER OF COLLISIONS | MEAN NUMBER OF COLLISIONS | MAXIMUM NUMBER OF COLLISIONS |
| 15-BIT-LENGTH RANDOM VALUE | 1.01 | 4 | 1 | 1 |
| CASE OF USING VALUE (STATIC NUMBER) CORRESPONDING TO ALLOCATION SITE AS IT IS AS HASH VALUE | 31.92 | 3031 | 4.06 | 27 |
| EMBODIMENT OF PRESENT INVENTION | 1.08 | 5 | 1.10 | 3 |

FIG. 12

METHOD OF TRACING OBJECT ALLOCATION SITE IN PROGRAM, AS WELL AS COMPUTER SYSTEM AND COMPUTER PROGRAM THEREFOR

CROSS REFERENCE TO RELATED APPLICATION

This application claims priority under 35 U.S.C. 119 from Japanese Patent Application 2009-49727, filed Mar. 3, 2009, the entire contents of which are incorporated herein by reference.

BACKGROUND OF THE INVENTION

1. Field of the Invention

The present invention relates to a method of tracing an object allocation site in a program, as well as a computer system and a computer program for tracing.

2. Description of Related Art

In many programs, numerous objects are dynamically allocated in the heap space of memory. There are multiple object allocation sites in the program, or more specifically, in source code or intermediate code such as bytecode. In the Java language for example, the object allocation site in the program is where the new operator for creating an object is described. The object described in the program is allocated in the heap space of memory at the time of program execution. If the object allocation site in source code or in intermediate code such as bytecode of the program can be detected from the object allocated in the heap space, debugging and optimization for various programs can be performed efficiently.

Assume, for example, that a memory leak is suspected at a certain point during program execution. If the allocation sites can be detected from all the live objects in the heap space, the site in the program in which many objects are allocated can be identified. Such identification allows a programmer to take a measure against the memory leak. Here, "a memory leak" is a phenomenon in which a usable memory space gradually decreases. A memory leak occurs when, for example, objects no longer needed remain and are accumulated in memory. "Live objects" are objects that are being referred to, with a pointer, by a program executing certain processing so as to be used in that processing.

There is a case, for example, where multiple threads frequently lock a certain object one after another. In this case, if the allocation site in the program of the certain object is identified, object lock reservations by other threads can be stopped so that a certain thread can lock the certain object. See K. Russell and D. Detlefs, Eliminating Synchronization-Related Atomic Operations with Biased Locking and Bulk Rebiasing. Proceedings of the ACM SIGPLAN 2006 Conference on Object-Oriented Programming, Systems, Languages, and Applications, pp. 263-272, 2006.

In one method to allow the object allocation site in the program to be identified, an object header is expanded, and an allocation site number having the size of one word is embedded in that expanded space. See R. Shaham, E. K. Kolodner, and M. Sagiv, Heap Profiling for Space-Efficient Java. Proceedings of the ACM SIGPLAN 2001 Conference on Programming Language Design and Implementation, pp. 104-113, 2001. However, since the method involves header expansion, more heap space is consumed. Moreover, use of the expansion header fundamentally changes how the heap space is used, and accordingly it becomes difficult to debug how the heap space is used.

Another conceivable method for allowing the object allocation site in the program to be identified is to prepare, outside the heap space, a correspondence table in which an object and its allocation site in the program are associated with each other on a one-on-one basis. With this method, however, the correspondence table increases in size in proportion to the number of objects. Consequently, more memory is consumed to store the correspondence table. Furthermore, this method requires processing of deleting, from the correspondence table, information on a dead object that is no longer being referred to by anything. Consequently, this method has a demerit that such deletion processing increases a program speed overhead.

In a program that involves allocation of many small-sized objects, e.g., a program created in the Java language, a run-time object in the heap space does not have information that indicates an object allocation site in the program.

There is an example in which information indicating the object allocation site in the program is added to the run-time object in the heap space. See R. Shaham, E. K. Kolodner, and M. Sagiv, Heap Profiling for Space-Efficient Java. Proceedings of the ACM SIGPLAN 2001 Conference on Programming Language Design and Implementation, pp. 104-113, 2001. In this example, however, extra space is consumed in the heap space. Accordingly, the existing methods still have a difficulty in allowing the object allocation site in the program to be efficiently traced from the run-time object in the heap space of memory without consuming much memory. Therefore, there is a demand for a method of efficiently tracing the object allocation site in the program.

SUMMARY OF THE INVENTION

In accordance with one aspect of the present invention, a method is provided for tracing an object allocation site from a run-time object having a hash-value field that includes, as a hash value, a value corresponding to the allocation site and an object identifier, the object allocation site being a site in a program allocating the run-time object. The method includes the steps of: acquiring the value corresponding to the allocation site from the hash value field; and identifying the object allocation site that corresponds to the acquired value.

In accordance with another aspect of the present invention, a method is provided for allowing an object allocation site to be traced from a run-time object having a hash-value field that includes, as a hash value, a value corresponding to the allocation site and an object identifier, the object allocation site being a site in a program allocating the run-time object. The method includes embedding a value corresponding to the object allocation site in the program, in the hash-value field, in response to an event in which the run-time object is allocated in a memory. The hash-value field includes, as a hash value, the embedded value and the object identifier, and the tracing is performed by identifying the object allocation site that corresponds to the embedded value.

In accordance with a further aspect of the present invention, a computer system is provided for tracing an object allocation site from a run-time object having a hash-value field that includes, as a hash value, a value corresponding to the allocation site and an object identifier, the object allocation site being a site in a program allocating the run-time object. The computer system includes a memory that stores the run-time object; an acquirer that acquires the value from the hash value field; and an identification unit that identifies the object allocation site that corresponds to the acquired value.

In a still further aspect of the present invention, computer programs are provided that, when executed, cause a computer to perform the above methods and/or to function as the above computer system.

BRIEF DESCRIPTION OF THE DRAWINGS

For a more complete understanding of the present invention and the advantages thereof, reference is now made to the following description taken in conjunction with the accompanying drawings.

FIG. 2A shows a data structure of an object in which a value corresponding to an allocation site is embedded in a hash value field included in the data structure (101) shown in FIG. 1, in the embodiment of the present invention.

FIG. 2B shows details of the hash-value field included in the run-time object (201) shown in FIG. 2A, in the embodiment of the present invention.

FIG. 3 is a conceptual diagram showing variable allocation of bits in the hash-value field shown in FIG. 2B, in the embodiment of the present invention.

FIG. 8A shows an example of a program to implement constant-value definition for the hash-value field shown in FIG. 2B, in the embodiment of the present invention.

FIG. 8B shows an example of a program to implement the data structure shown in FIG. 2A, in the embodiment of the present invention.

FIG. 8C shows an example of a program to implement a data structure related to the binary tree in FIG. 6B, in the embodiment of the present invention.

FIG. 8D shows an example of a program to implement incorporation of an algorithm for rewriting the hash-value field from a value (static number) to a value (dynamic number), in the function for referring to a hash value, in the embodiment of the present invention.

FIG. 8E shows the example of a program to implement incorporation of an algorithm for rewriting the hash-value field from a value (static number) to a value (dynamic number), in the function for referring to a hash value, in the embodiment of the present invention.

FIG. 8F shows the example of a program to implement incorporation of an algorithm for rewriting the hash-value field from a value (static number) to a value (dynamic number), in the function for referring to a hash value, in the embodiment of the present invention.

FIG. 10 shows an output example of a result of tracing an object allocation site, shown in FIGS. 9A to 9C, in the embodiment of the present invention.

FIG. 11 shows static numbers, for each class, of allocation sites in two applications (Trade6 and SPECjbb2005), in the embodiment of the present invention.

FIG. 12 shows the mean number and the maximum number of hash-value collisions in the two applications (Trade6 and SPECjbb2005) used in FIG. 11, in the embodiment of the present invention.

DETAILED DESCRIPTION OF THE PREFERRED EMBODIMENTS

Figure 1:
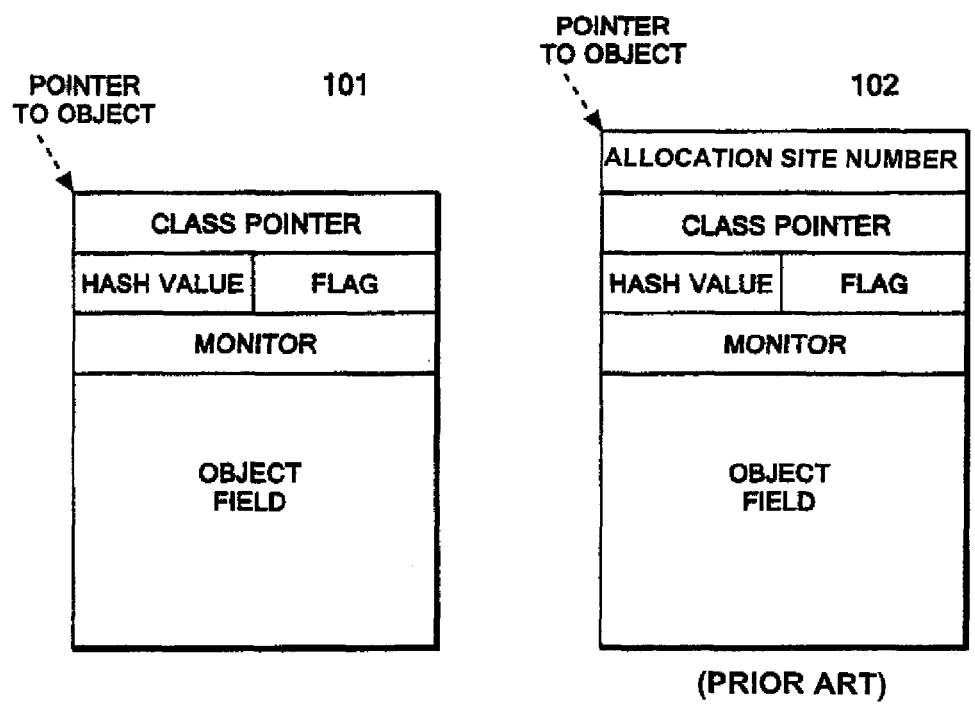
FIG. 1 shows an example of a data structure of a run-time object according to a conventional art.

The present invention provides a data structure of a run-time object having a hash value field, the data structure allowing an object allocation site to be traced from the run-time object, the object allocation site being a site in a program allocating the run-time object. In the data structure, the hash value field of the run-time object includes, as a hash value, a value corresponding to the allocation site and an object identifier. The trace of the object allocation site described in the program is performed by identifying the object allocation site that corresponds to the value.

The present invention also provides a method for tracing an object allocation site from a run-time object having a hash-value field, the object allocation site being a site in a program allocating the run-time object. The method includes causing a computer system to execute the following steps of: acquiring the value corresponding to the allocation site from the data structure; and identifying the object allocation site that corresponds to the acquired value.

In an embodiment of the present invention, the identification is performed by using a correspondence table (called a first correspondence table below) that records a correspondence between the value corresponding to the allocation site included in the hash-value field of the run-time object whose hash value has been referred to (the value being called a first value below), and the allocation site that corresponds to the first value, and by thus identifying the allocation site that corresponds to the first value.

In an embodiment of the present invention, the first value is obtained in response to an event in which the hash value of the run-time object including the value is referred to.

In an embodiment of the present invention, the first value is obtained using a binary tree structure.

In an embodiment of the present invention, the binary tree structure shows a correspondence relationship between the first value and an allocation site that corresponds to the first value, each branch of the binary tree structure shows a bit of the first value represented in bits, and a node of the binary tree structure shows the object allocation site.

In an embodiment of the present invention, the identification is performed by using a correspondence table (called a second correspondence table below) that records a correspondence between the value corresponding to the allocation site included in the hash-value field of the run-time object whose hash value has not been referred to (the value being called a second value below), and the allocation site that corresponds to the second value, and by thus identifying the allocation site that corresponds to the second value.

The present invention also provides a method for allowing an object allocation site to be traced from a run-time object having a hash-value field, the object allocation site being a site in a program allocating the run-time object. The method includes causing a computer system to execute the step of: embedding a value corresponding to the object allocation site in the program, in the hash-value field of the data structure, in response to an event in which the run-time object is allocated in a memory. Here, the hash-value field includes, as a hash value, the embedded value and the object identifier, and the tracing is performed by identifying the object allocation site that corresponds to the embedded value.

In an embodiment of the present invention, the method further includes causing a computer system to execute the steps of: replacing the embedded value with a calculated value, in response to execution of a command to refer to the hash value of the run-time object; and creating, in the memory, a correspondence table for the calculated value and the embedded value.

In an embodiment of the present invention, the method further includes causing a computer system to execute the step of making smaller a bit length allocated to the value in the hash-value field and making larger a bit length allocated to the object identifier, when many run-time objects are allocated in the memory from the same object allocation site in the program.

In an embodiment of the present invention, the step of making the bit length smaller and larger is performed when part or all of bits of the object identifier allocated randomly matches a predetermined bit pattern.

In an embodiment of the present invention, the method further includes causing a computer system to execute the step of setting a flag in response to issuance of the reference command, the flag being included in the hash-value field and indicating whether the reference command has been executed or not.

In an embodiment of the present invention, the step of replacing with the calculated value is not performed when the command to refer to the hash value of the run-time object including the hash-value field in which the flag is set is executed.

In an embodiment of the present invention, in the method, the memory is a heap space of the memory, and the method further includes causing a computer system to execute the step of scanning the heap space, finding the value of the hash-value field of a run-time object not being used, and using the found value for a new run-time object.

In an embodiment of the present invention, the scanning is performed through garbage collection.

In an embodiment of the present invention, the bit length allocated to the value is variable.

In an embodiment of the present invention, the hash-value field is in an object header of the run-time object.

The present invention also provides a computer program that causes a computer system to execute the steps of the method.

The present invention also provides a computer system for tracing an object allocation site from a run-time object having a hash-value field, the object allocation site being a site in a program allocating the run-time object. The computer system includes: a memory that stores the run-time object; an acquirer that acquires the value from the data structure; and an identification unit that identifies the object allocation site that corresponds to the acquired value.

The present invention further provides a computer system for allowing an object allocation site to be traced from a run-time object having a hash-value field, object allocation site being a site in a program allocating the run-time object. The computer system includes an embedment unit that embeds a value corresponding to the object allocation site in the program, in the hash-value field of the data structure, in response to an event in which the run-time object is allocated in a memory. Here, the hash-value field includes, as a hash value, the embedded value and the object identifier, and the tracing is performed by identifying the object allocation site that corresponds to the embedded value.

In one embodiment of the present invention, the computer system further includes: a replacer that replaces the embedded value with a calculated value, in response to execution of a command to refer to the hash value of the run-time object; and a creation unit that creates, in the memory, a correspondence table for the calculated value and the embedded value.

In one embodiment of the present invention, the computer system further includes an adjuster that makes smaller a bit length allocated to the value in the hash-value field and makes larger a bit length allocated to the object identifier, when many run-time objects are allocated in the memory from the same object allocation site in the program.

In one embodiment of the present invention, the computer system further includes a reuse unit that scans the heap space of the memory and thereby acquires a value of a hash-value field of a run-time object not being used.

According to the embodiment of the present invention, the hash-value field of an object on the heap space holds information for searching for the site in which the object has been allocated. Accordingly, the consumption of the heap space is not increased by the information thus held. Consequently, the environment in the heap space remains unchanged between during debugging and during execution.

Further, according to the embodiment of the present invention, memory consumption outside the heap space is not proportional to the number of objects. In other words, the memory consumption is slow compared to the increase of the number of objects. Accordingly, an object allocation site can be searched for with less memory consumption.

The present invention also provides a computer program that causes a general purpose computer system to function as the above-described apparatus.

In an embodiment of the present invention, an "object" is a concrete form of a target of an abstracted procedure on a program.

In the embodiment of the present invention, a "run-time object" is an object created at an allocation site of an object described in the program. The "run-time object" is an object allocated in memory, e. g., a heap space, at the time of the execution of the program. The run-time object is created from, for example, a class. The run-time object may remain in the heap space even after the program for example stops or completes the execution. The run-time object has a hash-value field. In addition, the run-time object may have an object header for holding information on the object. For example, the object header may include a class pointer, a flag, and a monitor. Moreover, the hash-value field may be included in the object header.

Note that, in the embodiment of the present invention, the "heap space" is not an entire heap space used in the program, but a part of the entire heap space, in which a run-time object is allocated. The heap space mentioned here is a heap space to be a target for garbage collection, for example.

In the embodiment of the present invention, a "hash-value field" is a field that the run-time object has. A hash-value field holds a hash value of the run-time object. A hash value is an identifier for identification between run-time objects. Note that, existing specifications for hash values allow two different run-time objects to hold the same hash value.

The hash-value field includes an allocation-value field and an identifier field. The hash-value field may include a reference flag. The hash-value field is described in detail later referring to FIG. 2B.

In the embodiment of the present invention, a "value corresponding to an allocation site" is a value that uniquely identifies the allocation site of an object on a program. The allocation-value field holds the value corresponding to an allocation site. The value here is either a value (static number) or a value (dynamic number).

For example, the value (static number) is a value representing a line number in a program or a relative position in program code. The value (static number) may be an identifier associated with the value representing a line number in a program or the relative position in program code. A computer system can obtain the line number from the identifier by referring to a correspondence table storing a correspondence between the identifier and the line number.

The value (dynamic number) is a value associated with the value (static number). The computer system can obtain the value (static number) from the value (dynamic number) by referring to the correspondence table storing the correspondence between the value (dynamic number) and the value (static number).

In the embodiment of the present invention, an "object identifier" is a random value. The identifier field holds the "object identifier."

The hash value is a combined value of the value corresponding to an allocation site and the object identifier. The combined value may include the reference flag.

In the embodiment of the present invention, a "program for allocating a run-time object having a hash-value field" is a program including a command for allocating, in memory, a run-time object having a hash-value field, in an execution environment of the program. For example, the "program for allocating a run-time object having a hash-value field" includes source code or intermediate code such as bytecode. Moreover, the "program for allocating a run-time object having a hash-value field" is, for example, a program written in an object-oriented language or is intermediate code into which the program is compiled. For example, the object-oriented language is Java and C++, but is not limited to these. For example, the execution environment of the program is JavaVM (Java Virtual Machine), but is not limited to this.

In the embodiment of the present invention, an "object allocation site" is a site in a program, where an object is assigned to an object variable in response to, for example, a creation command or a copy command, the program allocating a run-time object having a hash-value field. For example, the site in a program is the line number in the program or the relative position in program code.

In the embodiment of the present invention, "to trace" is to identify, from a run-time object, the object allocation site in the program for allocating the run-time object.

In the embodiment of the present invention, a "first correspondence table" records a correspondence between the value corresponding to an allocation site, included in a hash-value field of a run-time object the hash value of which has not been referred to (the value being called a first value below) and information for identifying the allocation site corresponding to the first value. The "information for identifying the allocation site corresponding to the first value" is information for identifying the value (static number).

In the embodiment of the present invention, a "second correspondence table" records a correspondence between the value corresponding to an allocation site, included in the hash-value field of a run-time object the hash value of which has not been referred to (the value being called a second value below) and an allocation site corresponding to the second value.

The embodiment of the present invention is described below referring to the drawings. It is to be understood that this embodiment is given only for illustrating a preferred embodiment of the present invention, and is not intended to limit the scope of the present invention to what is shown herein. In addition, throughout the drawings, the same reference numerals denote the same targets, unless otherwise noted.

In the following descriptions, first, an example of a data structure of a run-time object according to a conventional art is described referring to FIG. 1. Then, an example of a data structure of a run-time object according to the embodiment of the present invention is described referring to FIGS. 2A and 2B.

FIG. 1 shows an example of a data structure of a run-time object according to a prior art. FIG. 1 shows an example of a run-time object allocated by a program written in the Java language.

A run-time object (101) is allocated in the heap space in memory. The run-time object (101) includes an object header and an object field that holds an instance variable.

For example, an object header is constructed of three words. Note that one word is 32 bits. The first word holds a class pointer; the second word, a hash value and a flag; the third word, a monitor.

A class pointer is a pointer that points to a class to which an object belongs. A hash value is a value assigned to an object for identification between objects belonging to the class. For example, a flag indicates various states of an object. For example, the state is a lock state. A monitor is used for garbage collection.

An object header is constructed of two words or a single word in some cases.

An object field is a field storing an instance variable, which is a main body of the object.

A run-time object (102) is an example in which the run-time object (101) is expanded using the conventional art. In the conventional art, the object header is firstly expanded so that information for identifying an allocation site can be added to the run-time object (101). Then, an allocation site number having the size of one word is embedded in the extended region. Consequently, the run-time object (101) now has a data structure of the run-time object (102). Since the header is expanded, the run-time object (102) consumes more heap space than the run-time object (101).

FIG. 2A shows a data structure of an object in which a value corresponding to an allocation site is embedded in the hash value included in the data structure (101) shown in FIG. 1, in the embodiment of the present invention.

In a run-time object (201), the value corresponding to an allocation site is embedded in part of the hash-value field storing a hash value. The run-time object (201) does not undergo expansion unlike the run-time object (FIG. 1, 102). Therefore, there is no change in the heap space consumption before and after the embedment of the value corresponding to an allocation site. Further, the rest of the hash-value field is named an identifier field.

FIG. 2B shows details of the hash-value field included in the run-time object (201) shown in FIG. 2A, in the embodiment of the present invention.

A hash-value field (202) includes an allocation-value field and an identifier field. As a hash-value field (203) does, the hash-value field (202) may further include a reference flag.

The allocation-value field holds the value corresponding to an allocation site. This value is either a value (static number) or a value (dynamic number).

The identifier field holds the object identifier. The object identifier is a random value.

The reference flag is a flag indicating whether the hash-value field has been referred to by the program. For example, the reference flag is a value of 1 bit, in which 0 is set before the hash-value field is referred to, and 1 is set after the hash-value is referred to.

The hash-value field (202) is represented with at least a two-bit length. These bits are allocated to the allocation-value field and to the identifier field sequentially from the higher-order bits. Assume for example that the hash-value field (202) is represented with 8 bits, and that 5 bits are allocated to the allocation-value field, and 3 bits to the identifier field. Then, the allocation-value field can store $2^5=32$ different values corresponding to an allocation site, and the identifier field can store $2^3=8$ different object identifiers. Further, if the hash value stored in the hash-value field (202) is $(01010001)_2$, the value corresponding to an allocation site is $(01010)_2$ and the object identifier is $(001)_2$.

Meanwhile, if the hash-value field includes in its construction a reference flag as the hash-value field (203) does, the hash-value field is represented with at least a three-bit length.

The reference flag only needs a bit length necessary for representing whether the reference has been made or not. For example, 1 bit is allocated to the reference flag if 1 represents that the reference has been made and 0 represents that the reference has not been made. Assume for example that the hash-value field (203) is represented with 16 bits, and that 10 bits are allocated to the allocation-value field, 5 bits to the identifier field, and 1 bit to the reference flag. Then, the allocation-value field can store $2^{10}=1024$ different values corresponding to an allocation site, and the identifier field can store $2^5=32$ different object identifiers. Further, if the hash value stored in the hash-value field (203) is $(1011101110111011)_2$, the value corresponding to an allocation site is $(1011101110)_2$, the object identifier is $(11101)_2$, and the reference flag is 1.

A bit length must be smaller than one word for it to be allocated to the value corresponding to an allocation site. Although such a bit length might seem insufficient to designate an allocation site in the program, the run-time object has a class pointer with which the class of the object can be uniquely identified. Accordingly, the value corresponding to an allocation site does not need to be unique in the entire program. The value only needs to differentiate the allocation site of an object from others in the same class. Therefore, in most cases a bit length smaller than one word is sufficient to represent a value corresponding to an allocation site.

How to handle a case where such bit length is insufficient is described below referring to FIG. 3.

Here, a hash value stored in the hash-value field is a value used for identifying objects from each other. In a program written in the Java language for example, a random value is set for an object value at the timing when the object is allocated. In the embodiment of the present invention, a value corresponding to an allocation site, an object identifier, and a reference flag may be embedded in the hash value. Then, the hash value after the embedment is still used for identifying objects from each other.

FIG. 3 is a conceptual diagram showing variable allocation of bits in the hash-value field shown in FIG. 2B, in the embodiment of the present invention.

In the embodiment of the present invention, run-time objects allocated at the same site have the same value (static number) corresponding to the allocation site. Accordingly, using the value (static number) only, the run-time objects allocated at the same site have the same value of bits representing the value (static number), included in the bits representing the hash value.

Here, when allocation of bits in the hash-value field employs fixed allocation, a bit length allocatable to the object identifier becomes small as a bit length allocated to the value corresponding to the allocation site becomes large. In other words, the number of objects identifiable by the object identifiers decreases as the number of allocatable bits decreases. Accordingly, when a large number of run-time objects are allocated at the same site on program code, collision of hash values is likely to occur.

The collision of hash values means that different objects have the same hash value. In a regular program, objects of different classes rarely have their hash values compared to each other even when they have the same hash value. However, objects of the same class have their hash values compared to each other more often than the objects of different classes do. Accordingly, it is desirable that at least objects of the same class have different hash values.

In the embodiment of the present invention, to avoid such collision of hash values, the bit length of the allocation-value field is made variable according to the amount of objects allocated at the same site, the amount being predicted based on the structure of source code. How to make the bit length variable is described below taking a scenario (301) and a scenario (302) shown in FIG. 3 as examples.

The scenario (301) shows an example in which a large number of objects are allocated at the same site. In the code shown in the scenario (301), a large number of the same objects are allocated in a loop. When the program has such code as shown in the scenario (301), it is effective to make large the bit length of the identifier field of an object allocated by that code, and to make small the bit length of the allocation-value field. In a regular program, each class is thought to have a few sites that allocate a large number of objects of the certain class. Accordingly, there is no problem with the bit length of the allocation-value field being small.

The scenario (302) shows an example in which a large number of objects are unlikely to be allocated at the same site. In the code shown in the scenario (302), a different object is allocated according to the type of error. In the code shown in the scenario (302), only one object is allocated in response to the occurrence of error, so that it is unlikely that a large number of objects are allocated at the same site. Further, an object corresponding to error not occurring is not allocated.

In a regular program, as in the case of the code shown in the scenario (302), it is thought that there are many sites that allocate few objects. When the program has such code as shown in the scenario (302), it is effective to make large the bit length of the allocation-value field, and to make small the bit length of the identifier field. Since few objects are allocated, there is no problem with the bit length of the identifier field being small.

Generally, how many objects are allocated at a certain allocation site is unknown until the program is actually run. Accordingly, in the embodiment of the present invention, the bit length of the allocation-value field is dynamically reduced in response to many objects being allocated at the same allocation site. Such reduction involves allocation of multiple values (dynamic numbers) to each allocation site. The value (dynamic number) first allocated to the allocation site has a large bit length. The value may be a value (static number). If many objects are allocated at the allocation site, a new value (dynamic number) having a smaller bit length is allocated to the allocation site. When the new value (dynamic number) having a small bit length is allocated, the bit length of the allocation-value field of the object is reduced to the bit length of the new value (dynamic number). Then, the new, short value (dynamic number) is embedded therein. When many objects are further allocated at the allocation site, a new, even smaller value (dynamic number) is allocated at the allocation site. The correspondence table recording a correspondence between the multiple values (dynamic numbers) and the allocation site is held in a memory area other than the heap space.

The method of dynamically reducing the bit length of the allocation-value field requires special processing of referring to the correspondence table at the time of object allocation. This increases a speed overhead of the program, compared to the case of the simple object allocation. In an actual program, however, almost all the hash values of objects are never referred to during the execution. Further, for example in the Java language, in many classes of objects including a hash-Code( )method for referring to a hash value, the hash-Code( )method is overridden. Here, a unique hash value is defined in that overridden method. Accordingly, the hash value embedded in the hash-value field is not referred to.

If the value (dynamic number) is used, the above-mentioned special processing is required. If the value (static number) is used, on the other hand, the special processing is not required. Accordingly, if the value (static number) is used, the program runs fast, compared to the case of using the value (dynamic number). However, if the value (static number) is used, the bit length of the allocation-value field cannot be changed according to the number of objects allocated at the same site.

Considering these, how to use both the value (static number) and the value (dynamic number) is described below.

Figure 4A:
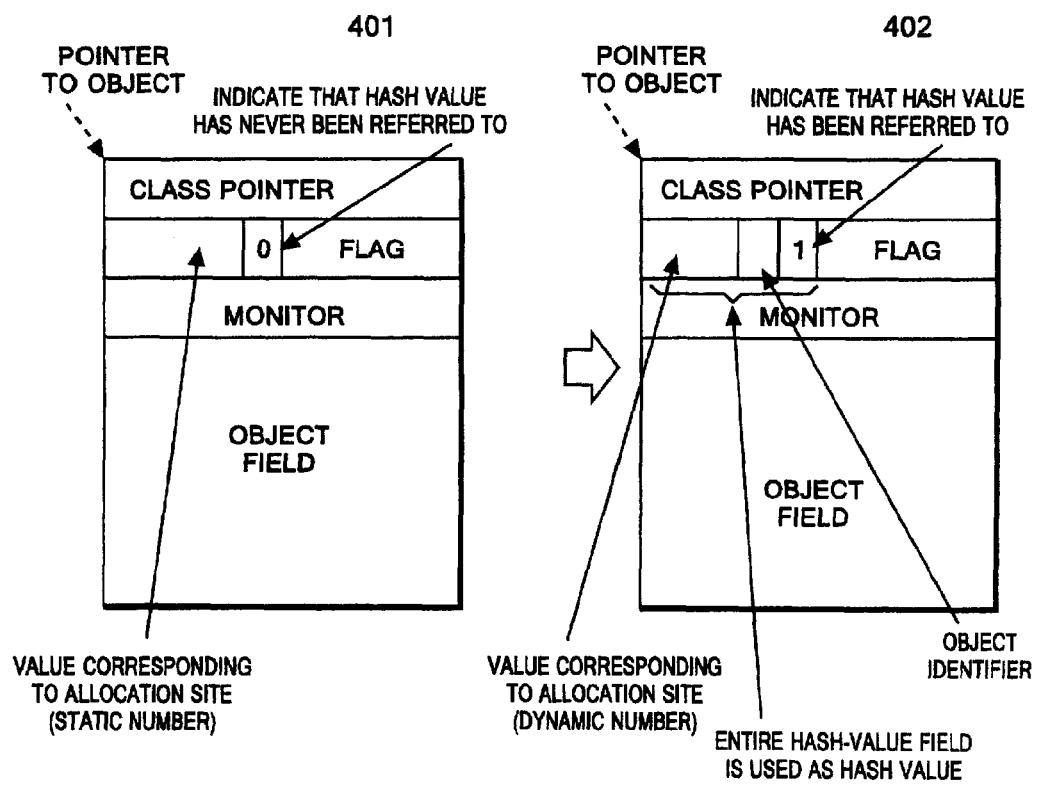
FIG. 4A shows an example of using both a value (static number) and a value (dynamic number) in the object shown in FIG. 2A, in the embodiment of the present invention.

FIG. 4A shows an example of using both the value (static number) and the value (dynamic number) in the object shown in FIG. 2A, in the embodiment of the present invention.

A run-time object (401) shows a run-time object in which the value (static number) is used as a value corresponding to an object allocation site in a program. A run-time object (402) shows a run-time object in which the value (dynamic number) is used as the value corresponding to an object allocation site in a program.

When both the value (static number) and the value (dynamic number) are used, the computer system embeds a value (static number) in the hash-value field of the run-time object (401) in response to the run-time object being allocated at the heap space. Then, the computer system replaces the value (static number) with a value (dynamic number) at the time of first execution of a command to refer to the hash value of the run-time object.

A detailed description is given below of embedment of a value (static number) in a hash-value field.

In response to an allocation of a run-time object in the heap space, the computer system embeds a value (static number) in the hash-value field of the run-time object. The computer system can embed the value (static number) at high speed in the hash-value field if the length of the value (static number) is fixed. At this time, the computer system may embed an identifier corresponding to the value (static number) in the hash-value field. In addition, the computer system embeds, in the hash-value field, a reference flag indicating that the hash value has never been referred to. For example, the computer system sets "0" in the reference flag if 0 is to represent that the object has not been referred to. Note that the computer system does not need to set an object identifier here.

Replacement of a value (static number) with a value (dynamic number) is described in detail below.

In response to a command to refer to the hash value of the run-time object being executed for the first time, the computer system replaces the hash-value field. This replacement involves embedment of a value (dynamic number) in the hash-value field. Further, the computer system generates a random number to use it as an object identifier, and embeds the generated random number in the hash-value field. Further, the computer system sets a value in the reference flag, indicating that the object has been referred to. This value is "1" for example. As a hash value, the computer system returns the replaced value of the hash-value field to the referrer. Note that, once replaced, the hash-value field is never replaced again while the object having that hash-value field is alive.

For example, the computer system may detect the "allocation of a run-time object in the heap space" and the "first execution of a command to refer to the hash value of the run-time object" when the program is just-in-time (JIT) compiled. Further, when the program is executed by an interpreter, the computer system may detect the "allocation of a run-time object in the heap space" and the "first execution of a command to refer to the hash value of the run-time object" in response to the program being loaded on memory or being executed.

This detection may be carried out when an allocation command or a reference command included in source code or intermediate code is scanned.

Moreover, the processing for replacing the hash-value field may be added to the allocation command and the reference command themselves included in a class library.

When both the value (static number) and the value (dynamic number) are used, 1 bit is necessarily reserved for the reference flag that indicates whether the hash value of an object has been referred to or not. Accordingly, the bit length of bits usable for the allocation-value field or the identifier field is reduced by 1 bit.

Compared to using the value (dynamic number) only, speed overhead can be reduced by using both the value (static number) and the value (dynamic number). In addition, since a larger bit length is used for the value (static number) than for the value (dynamic number), the bit length to hold the value corresponding to an allocation site is less likely to be insufficient, compared to using the value (dynamic number) only.

Figure 4B:
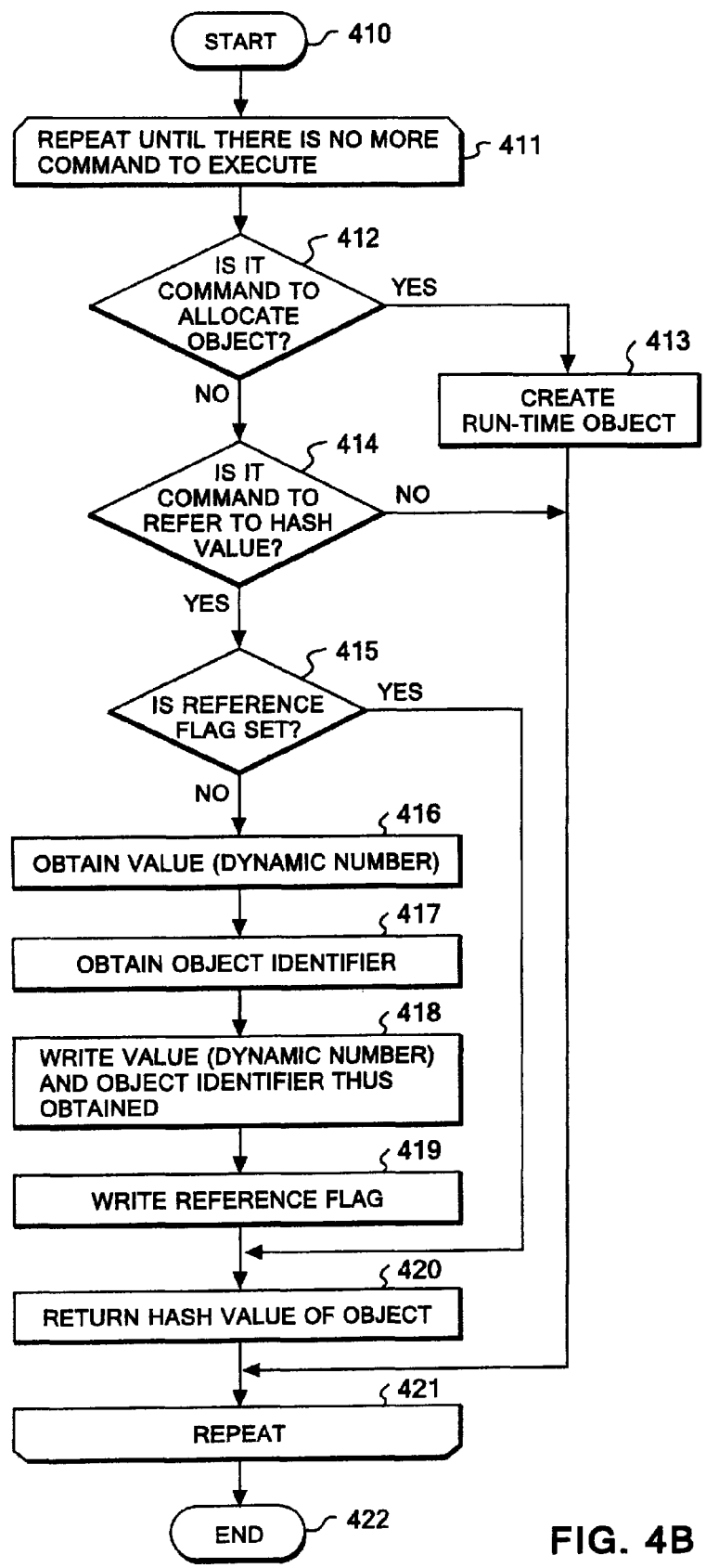
FIG. 4B is a flowchart of processing of an example shown in FIG. 4A using both values, in the embodiment of the present invention.

FIG. 4B is a flowchart of processing of an example shown in FIG. 4A using both values, in the embodiment of the present invention.

In Step 410, the processing starts.

In Step 410, the computer system executes a program in which an allocation site of an object in the program is traced (sometimes called a "traced program" below). By this execution, at least one command included in the traced program is executed.

In Step 411, the computer system determines whether all the commands to be executed are completed or not. The computer system repeats Steps 412 to 420 until all the commands are completed. When not all the commands are completed, the computer system acquires a command to be executed next from the program, and the processing proceeds to Step 412. When all the commands are completed, the processing proceeds to Step 422 and ends.

In Step 412, the computer system determines whether the acquired command is a command to assign an object or not. If the acquired command is a command to assign an object, the processing proceeds to Step 413. If the acquired command is not a command to assign an object, the processing proceeds to Step 414.

In Step 413, the computer system executes the command to assign an object, and creates a run-time object. The run-time object is created in memory, specifically, in the heap space in memory. In the hash-value field of the run-time object, the computer system embeds a reference flag and a value (static number) corresponding to an allocation site in the program. The computer system may acquire an identifier corresponding to the value (static number) from a second correspondence table, and embed the corresponding identifier in the hash-value field as the value (static number). In order for the computer system to use the second correspondence table, the user saves in advance in the second correspondence table, a correspondence between the value (static number) and the corresponding identifier. Further, when setting the reference flag, the computer system sets a value indicating that the run-time object has not been referred to, e.g., 0. In response to the embedment being completed, the processing proceeds to Step 421.

In Step 414, the computer system determines whether the acquired command is a command by a referrer to refer to the hash value of the object. If the acquired command is a command to refer to the hash value of the object, the processing proceeds to Step 415. If the acquired command is not a command to refer to the hash value of the object, the processing proceeds to Step 421.

In Step 415, the computer system determines whether the reference flag of the referred object is set or not. From the hash-value field of the run-time object, the computer system first acquires the reference flag of the run-time object the hash value of which is to be referred to. When a value indicating that the run-time object has not been referred to is set as the acquired reference flag, the computer system determines that a value (static number) is embedded in the hash-value field, and the processing proceeds to Step 416. When a value indicating that the run-time object has been referred to is set as the acquired reference flag, the computer system determines that a value (dynamic number) is embedded in the hash-value field, and the processing proceeds to Step 420.

In Step 416, the computer system obtains a value (dynamic number). For example, the computer system obtains the value (dynamic number) using a binary tree, which will be described later. Further, using the binary tree, the computer system obtains a current value (dynamic number) having a predetermined bit length and corresponding to the value (static number), in the hash-value field of the run-time object, corresponding to an allocation site.

In Step 417, the computer system obtains an object identifier. In the case of the C++ language for example, the computer system uses part of bits for an address of a this pointer, as the object identifier. In the case of the Java language for example, the computer system uses a random value obtained using a random function, as the object identifier.

In Step 418, the computer system writes the value (dynamic number) and the object identifier in the hash-value field of the run-time object. In this writing process, the computer system acquires, from the hash-value field, the value (static number) written in the hash-value field of the run-time object at the time of the object allocation. Then, the computer system saves a correspondence between the acquired value (static number) and the obtained value (dynamic number) in the first correspondence table. In response to the completion of the saving, the computer system writes the obtained value (dynamic number) and the object identifier in the hash-value field of the run-time object.

In Step 419, the computer system writes a reference flag indicating that the hash value has been referred to, in the hash-value field of the run-time object. For example, the value of the written reference flag is 1 if the value set in Step 413 is 0.

In Step 420, the computer system returns the value of the hash-value field to the referrer, as a hash value of the object.

In Step 421, the processing returns to Step 411.

In Step 422, the processing ends.

Figure 4C:
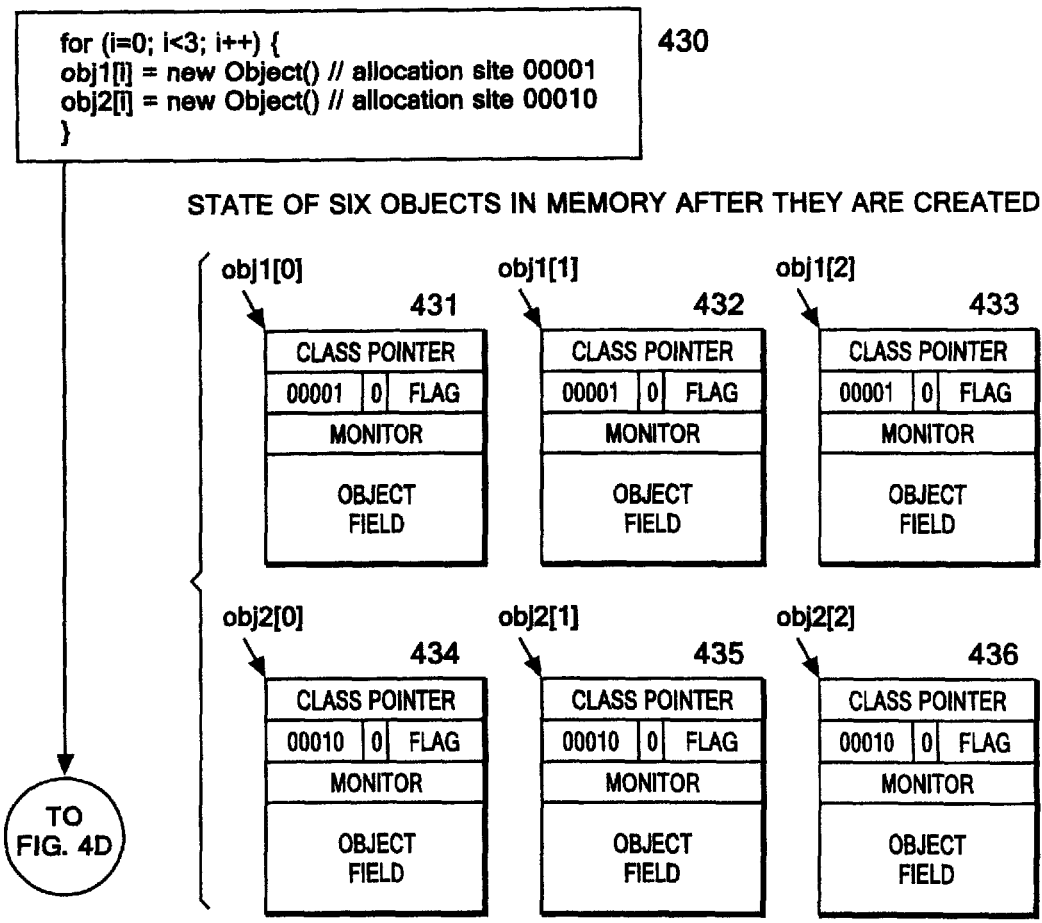
FIG. 4C shows an example of a data structure of a run-time object in which a value is embedded in the hash-value field in response to object allocation in a program, in the embodiment of the present invention.

FIG. 4C shows an example of a data structure of a run-time object in which a value is embedded in the hash-value field in response to object allocation in a program, in the embodiment of the present invention.

A program code (430) describes that three objects are allocated at each of two allocation sites in the program, (00001) and (00010). According to the allocation, six run-time objects (431 to 436) are allocated in the heap space in memory. The objects (431 to 433) allocated at the allocation site (00001) have the same data structure as the structure of the object (401) shown in FIG. 4A. Specifically, a value corresponding to the allocation site (00001), which is (00001), and a reference flag are embedded in the hash-value field. The value (00001) is a value (static number). The reference flag is 0. Here, 0 indicates that the hash value has not been referred to. Moreover, the objects (434 to 436) allocated at the allocation site (00010) have the same data structure as the structure of the object (401) shown in FIG. 4A. Specifically, a value corresponding to the allocation site (00010), which is (00010), and a reference flag are embedded in the hash-value field. The value (00010) is a value (static number). The reference flag is 0.

Figure 4D:
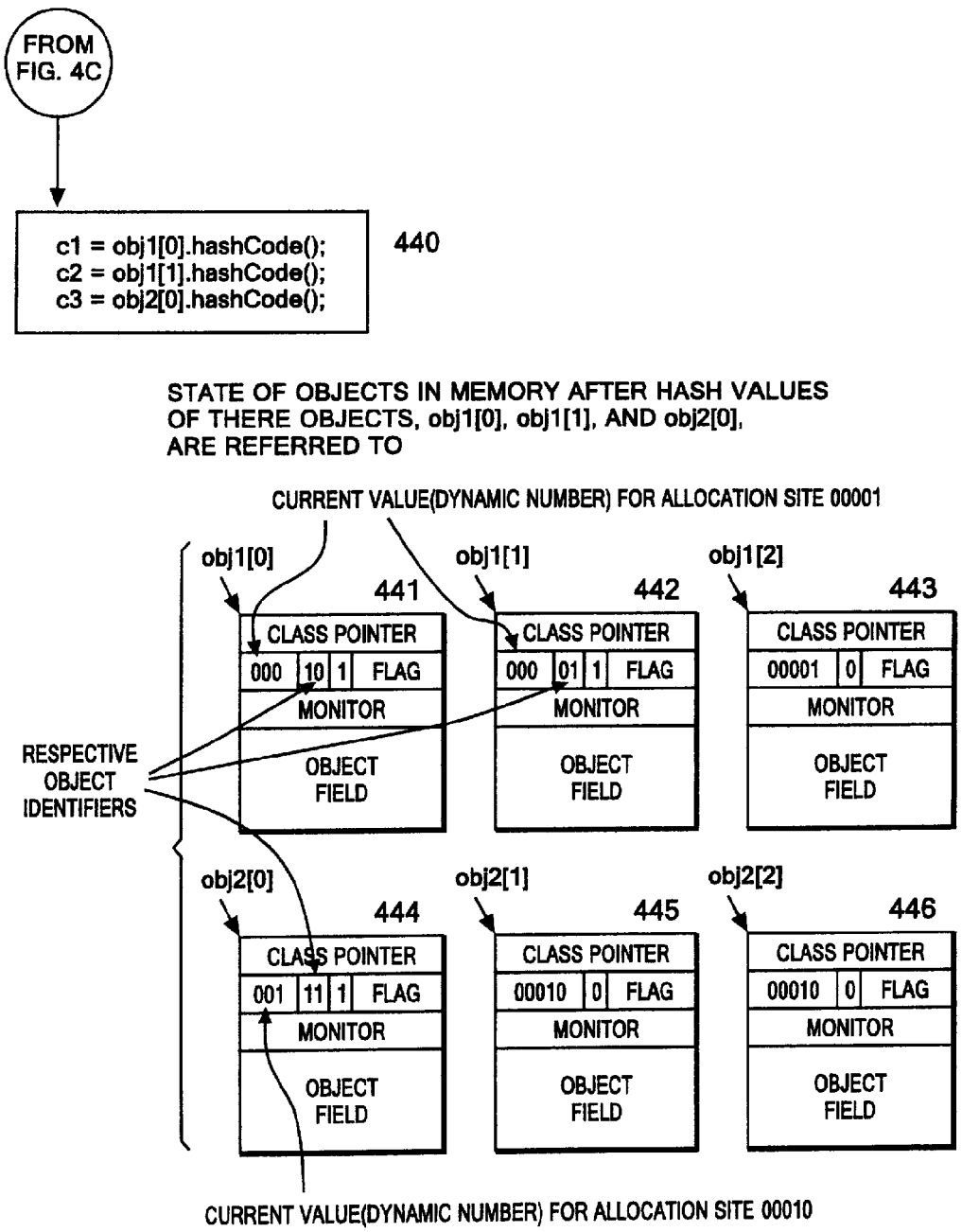
FIG. 4D shows an example of a data structure of a run-time object in which the value of the hash-value field is replaced in response to a command to refer to the hash value in the program, in the embodiment of the present invention.

FIG. 4D shows an example of a data structure of a run-time object in which the value of the hash-value field is replaced in response to a command to refer to the hash value in the program, in the embodiment of the present invention.

A program code (440) describes three commands to refer to the hash values of objects in the program. Objects (441 to 446) each shows the data structure of the run-time object after execution of the commands. The run-time objects (441 to 446) correspond to the run-time objects (431 to 436) in FIG. 4C, respectively.

The run-time objects (441 and 442) respectively show the data structures of run-time objects obj1[0] and obj1[1] changed by the reference of the hash values of the objects obj1[0] and obj1[1] in the allocation site 00001. In the hash-value field of the run-time object (441), a value (dynamic number) corresponding to the allocation site 000, an object identifier 10, and a reference flag 1 are embedded. Here, the reference flag 1 indicates that the hash value has been referred to. In the hash-value field of the run-time object (442), a value (dynamic number) corresponding to the allocation site 000, an object identifier 01, and a reference flag 1 are embedded.

Similarly, the run-time object (444) shows the data structure of a run-time object obj2[0] changed by the reference of the hash value of the object obj2[0] in the allocation site 00010. In the hash-value field of the run-time object (444), a value (dynamic number) corresponding to the allocation site 001, an object identifier 11 and a reference flag 1 are embedded. Not having been referred to, other run-time objects have exactly the same data structures as those in FIG. 4C, which are structures before the above-mentioned objects are referred to.

When the program code (440) is executed again, there is no change in any of the data structure (441) of the run-time object obj1[0], the data structure (442) of the run-time object obj1[1], and the data structure (444) of the run-time object obj2[0]. In other words, once a dynamic number is allocated to a run-time object, the value of its hash-value field is not replaced as long as the run-time object is alive.

Figure 5:
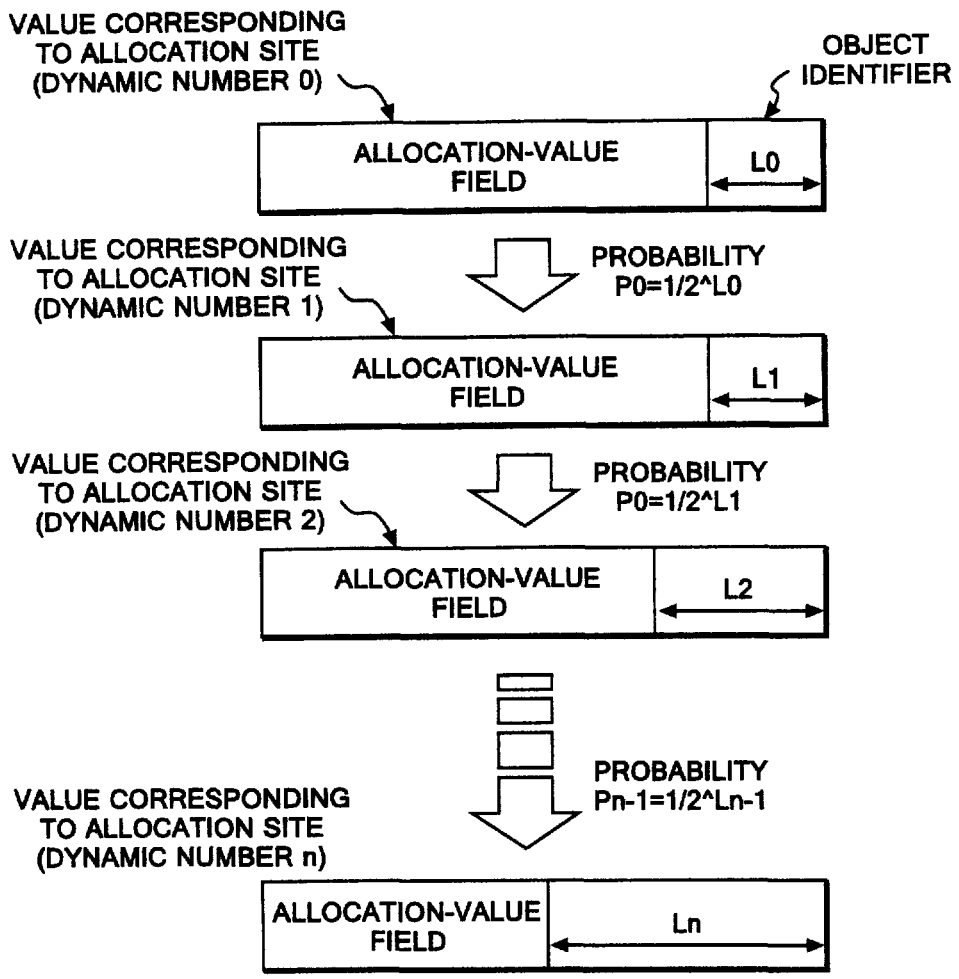
FIG. 5 shows how the bit length of an allocation-value field is dynamically reduced, in the embodiment of the present invention.

FIG. 5 shows how the bit length of an allocation-value field is dynamically reduced, in the embodiment of the present invention.

The first value (dynamic number) 0 is allocated to the hash-value fields every time the hash value of any of the objects allocated at an allocation site x having the value (dynamic number) is first referred to.

The value (dynamic number) 0 first allocated to the allocation site x has a relatively large bit length, and the bit length of the object identifier is L0. When many objects are allocated at the allocation site having the value (dynamic number) and then the hash value of any of the allocated objects is referred to, a new value (dynamic number) having a smaller bit length is allocated, at a timing to be described later, as a value (dynamic number) corresponding to the allocation site.

In the embodiment of the present invention, probabilistic timing is used for the timing to allocate a new value (dynamic number). Specifically, when part or all of bits for the object identifier is zero at the time of the reference, a value (dynamic number) 1 having a new bit length is allocated as the value (dynamic number) corresponding to the allocation site. Similarly, a value (dynamic number) 2, 3, ... or n having a smaller bit length is allocated with a probability of $P1(=\frac{1}{2}^{L1})$, $P2(=\frac{1}{2}^{L2})$ ... $Pn_{-1}(=\frac{1}{2}^{Ln_{-1}})$, respectively.

In addition, as shown on the right hand in FIG. 5, every time a new value (dynamic number) 1, 2, ... or n is allocated, a new entry is added to a correspondence table recording correspondences between the values (dynamic numbers) 1, 2, ... and n and the allocation site x. The correspondence table is allocated outside the heap space, and its size is proportional to the number of values (dynamic numbers). Accordingly, the size of the correspondence table is not proportional to the number of objects. The number of values (dynamic numbers) can be represented in the bit length of the hash-value field at the most. If the bit length of the hash-value field is 14, the number of values (dynamic numbers) do not exceed $2^{14}$.

In addition, as the method of dynamically reducing the bit length of the allocation-value field, there is also a method in which a counter for counting the number of allocations is provided for each allocation site, and a new value (dynamic number) is allocated when the number of allocations exceeds a threshold. However, such provision of the counter is not preferable considering the processing speed of the program.

Figure 6A:
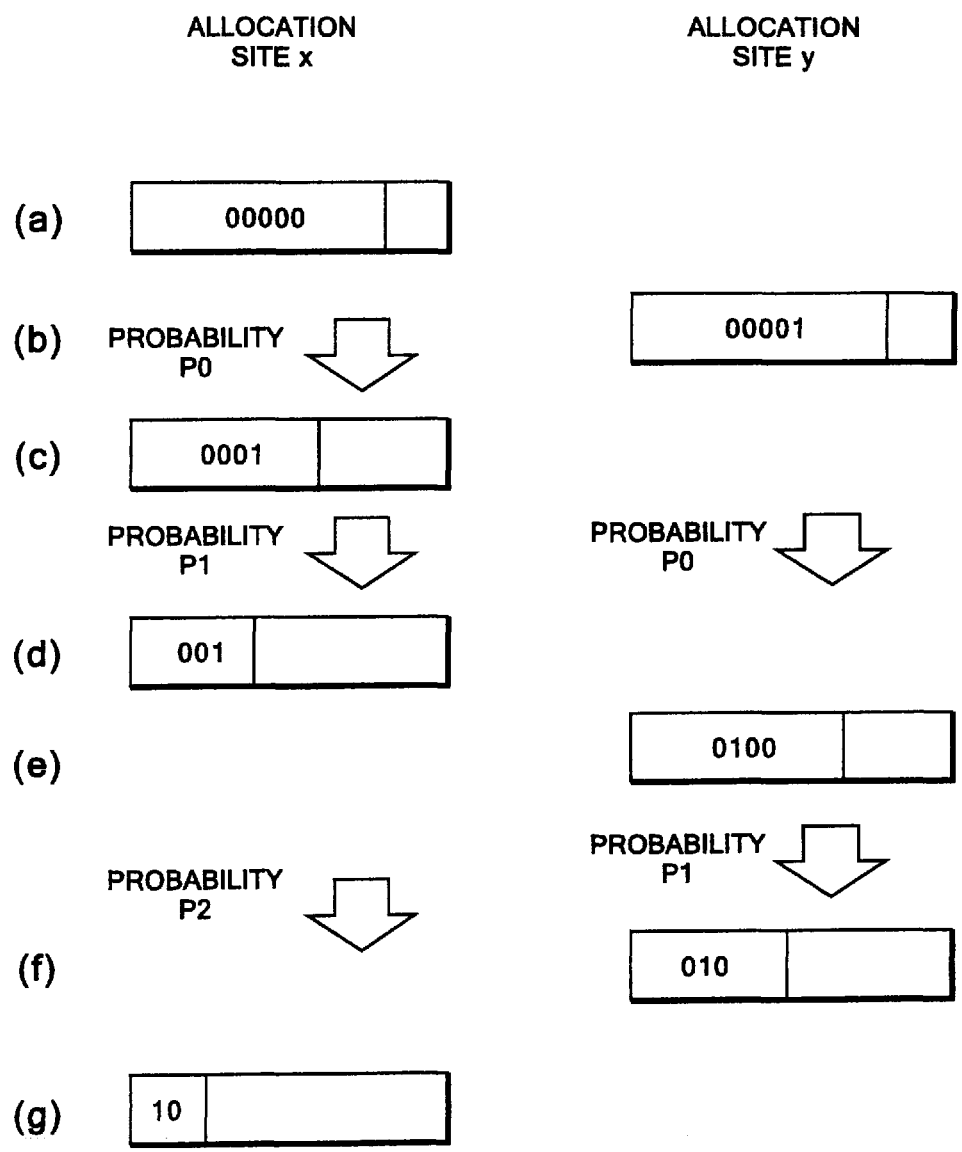
FIG. 6A shows an example of allocating, in the hash-value field shown in FIG. 5, a value (dynamic number) to two allocation sites x and y using a binary tree, in the embodiment of the present invention.
Figure 6B:
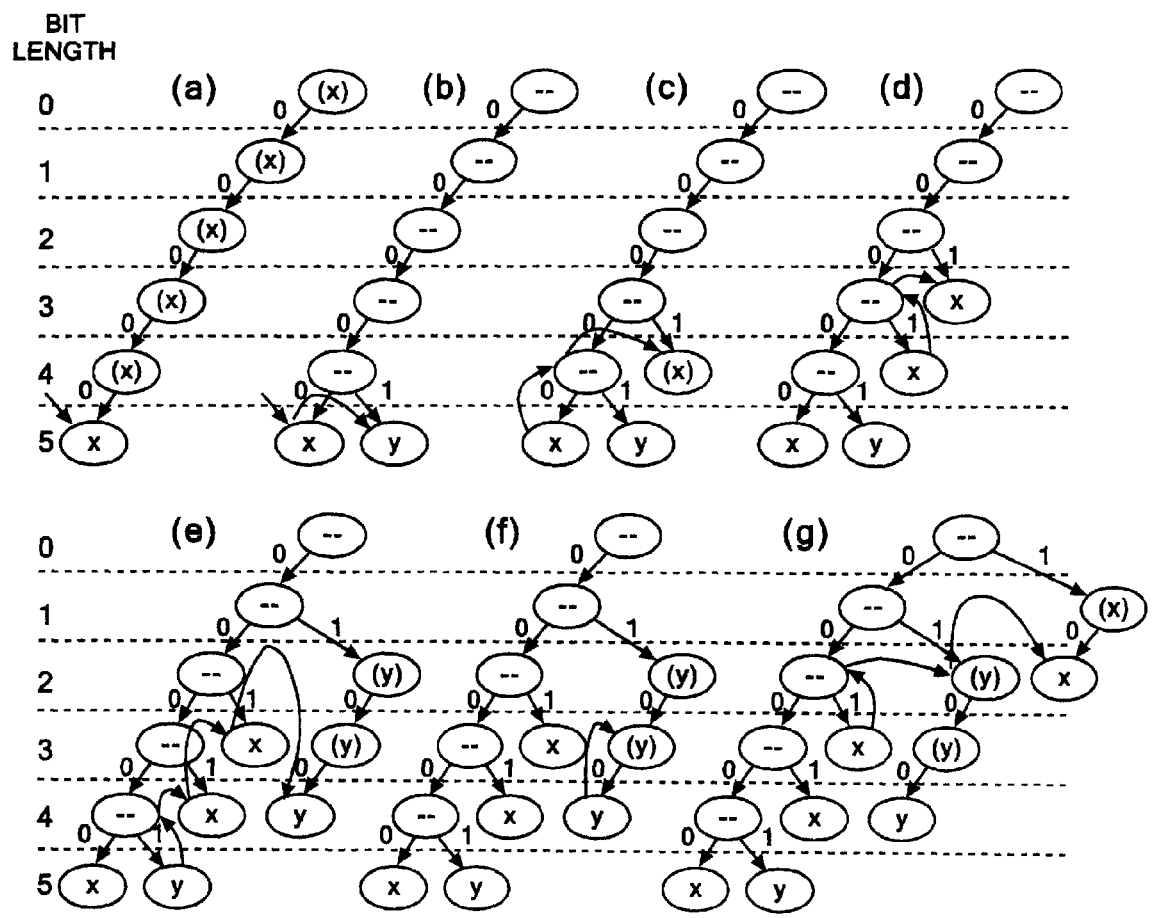
FIG. 6B shows an example of a binary tree used for allocating, in the hash-value field shown in FIG. 5, a value (dynamic number) to two allocation sites x and y, in the embodiment of the present invention.

FIGS. 6A and 6B each show an example of allocating, in the hash-value field shown in FIG. 5, a value (dynamic number) to two allocation sites x and y using a binary tree, in the embodiment of the present invention.

FIG. 6A shows how a value of a smaller and smaller bit length is allocated in each of the steps shown by (a) to (g). FIG. 6A also shows how the bit length of an allocation-value field is dynamically reduced. FIG. 6B shows allocation operations on the binary trees that correspond to the steps (a) to (g), respectively. Here, values (dynamic numbers) 00000, 0001, 001, and 10 are allocated to the allocation site x in the order of (a), (c), (d), and (g), respectively. Then, values (dynamic numbers) 00001, 0100, and 010 are allocated to the allocation site y in the order of (b), (e), and (f), respectively. For the convenience of illustration, the maximum bit length used for a value (dynamic number) is 5 here. Specifically, the allocation of values (dynamic numbers) is implemented by use of a binary tree structure shown in FIG. 6B. Here, the binary tree structure is a tree structure in which a node has two branches. In such tree structure, a node on the right always has a larger (or smaller) value than a node on the left at the same height, for example.

The binary tree represents a correspondence between the code (encoding) of a value (dynamic number) and the allocation site x or y.

A description will be given below in the order of the steps (a) to (g).

(a) In response to the hash value of any of objects allocated at the allocation site x being first referred to, a value (dynamic number) 00000 is allocated to x (see FIG. 6A (a)). In response to this allocation, as shown in FIG. 6B (a), a binary tree having the value (dynamic number) 00000 as a branch and having a corresponding class is generated. Here, nodes labeled with (x) are so labeled only to illustrate that they can be allocated to the allocation site x at that point; (x) is not actually written in the nodes labeled with (x).

(b) In response to the hash value of any of objects allocated at the allocation site y being first referred to, the binary tree is searched for a next free value (dynamic number) of a 5-bit length (see FIG. 6B (b)), and 00001 is allocated (see FIG. 6A (b)). As a result, nodes that represent 0, 00, 000, and 0000 cannot be allocated to any allocation site. This is because a distinction cannot be made between x and y if such values exist. Note that the labels (--) in the binary tree (see FIG. 6B (b)) are shown only to illustrate values (dynamic numbers) that cannot be allocated to any allocation site at that point; (--) is not actually written in the nodes labeled with (--).

(c) When many objects are allocated at x, and the hash value of at least one of the allocated objects is referred to, the bit length of the value (dynamic number) for x is reduced to 4 with a probability of P0. Then, the binary tree is searched for a 4-bit-length value (dynamic number) free for x (see FIG. 6B (c)), and a value (dynamic number) 0001 is allocated for x (see FIG. 6A (c)).

(d) Next, when many objects are allocated at x, and the hash value of at least one of the allocated objects is referred to, the bit length of the value (dynamic number) for x is reduced to 3 with a probability of P1. Then, the binary tree is searched for a 3-bit-length value (dynamic number) free for x (see FIG. 6B (d)), and a value (dynamic number) 001 is obtained for x (see FIG. 6A (d)).

(e) When many objects are allocated at y, and the hash value of any of the allocated objects is referred to, the bit length of the value (dynamic number) for y is reduced to 4 with a probability of P0. Then, the binary tree is searched for a 4-bit-length value (dynamic number) free for y (see FIG. 6B (e)), and a value (dynamic number) 0100 is obtained for y (see FIG. 6A (e)).

(f) Next, when many objects are allocated at y, and the hash value of any of the allocated objects is referred to, the bit length of the value (dynamic number) for y is reduced to 3 with a probability of P1. Then, the binary tree is searched for a 3-bit-length value (dynamic number) free for y (see FIG. 6B (f)), and a value (dynamic number) 010 is obtained (see FIG. 6A (f)). Since there is only y below the current node, a distinction can be made between x and y.

(g) Similarly, when many objects are allocated at x, and the hash value of any of the allocated objects is referred to, the bit length of the value (dynamic number) for x is reduced to 2 with a probability of P2. Then, the binary tree is searched for a 2-bit-length value (dynamic number) free for x (see FIG. 6B (g)). The value (dynamic number) obtained as a result of the search is 10 (see FIG. 6A (g)).

The binary tree can also be used as a correspondence table for finding an allocation site from a value (dynamic number). How to obtain an object allocation site from the binary tree is described below.

The computer system acquires bits representing the hash value of an object from the left. In the order in which the bits are acquired, the computer system descends, from a root node, binary tree branches that correspond to the acquired bits, respectively. If a node in which an allocation site is set is found in the descending process, the computer system sets this allocation site as the allocation site to be obtained.

When the hash value of an object is $(1011)_2$ for example, the computer system descends the binary tree from a root node in the order of a branch corresponding to 1, a branch corresponding to 0, a branch corresponding to 1, and a branch corresponding to 1. Here, assume for example that there is nothing set in a node reached by descending from a branch corresponding to the first digit from the left, namely, 1. Further assume that an allocation site is set in a node reached by descending from a branch corresponding to the second digit from the left, namely, 0. In this example, the computer system sets the allocation site set in the node reached by descending from the branch corresponding to 0, which is the second digit from the left, as the allocation site to be obtained.

To obtain an allocation site of an object from the binary tree, the computer system may use bits of a returned value (dynamic number). A description is given below of bits of a returned value (dynamic number).

A value (dynamic number) is set randomly for each class; therefore, a value obtained by exclusive-ORing a value (dynamic number) and a constant value unique to the class CLASS_HASH is used as a value (dynamic number). To obtain the allocation site, the word having the hash value of the object and CLASS_HASH are exclusive-ORed. The value (dynamic number) needs to be returned to the value (dynamic number) before being exclusive-ORed. Note that, for example, CLASS_HASH is part of an address of a class object, and is a random value unique to the class. An object allocation site may be obtained from the binary tree, using bits of the returned value (dynamic number).

In the example shown in FIGS. 6A and 6B, the search starts from a node allocated last for each allocation site. To increase the speed, the node allocated last may be saved for each bit length to start the next search from that allocated node.

Figure 7:
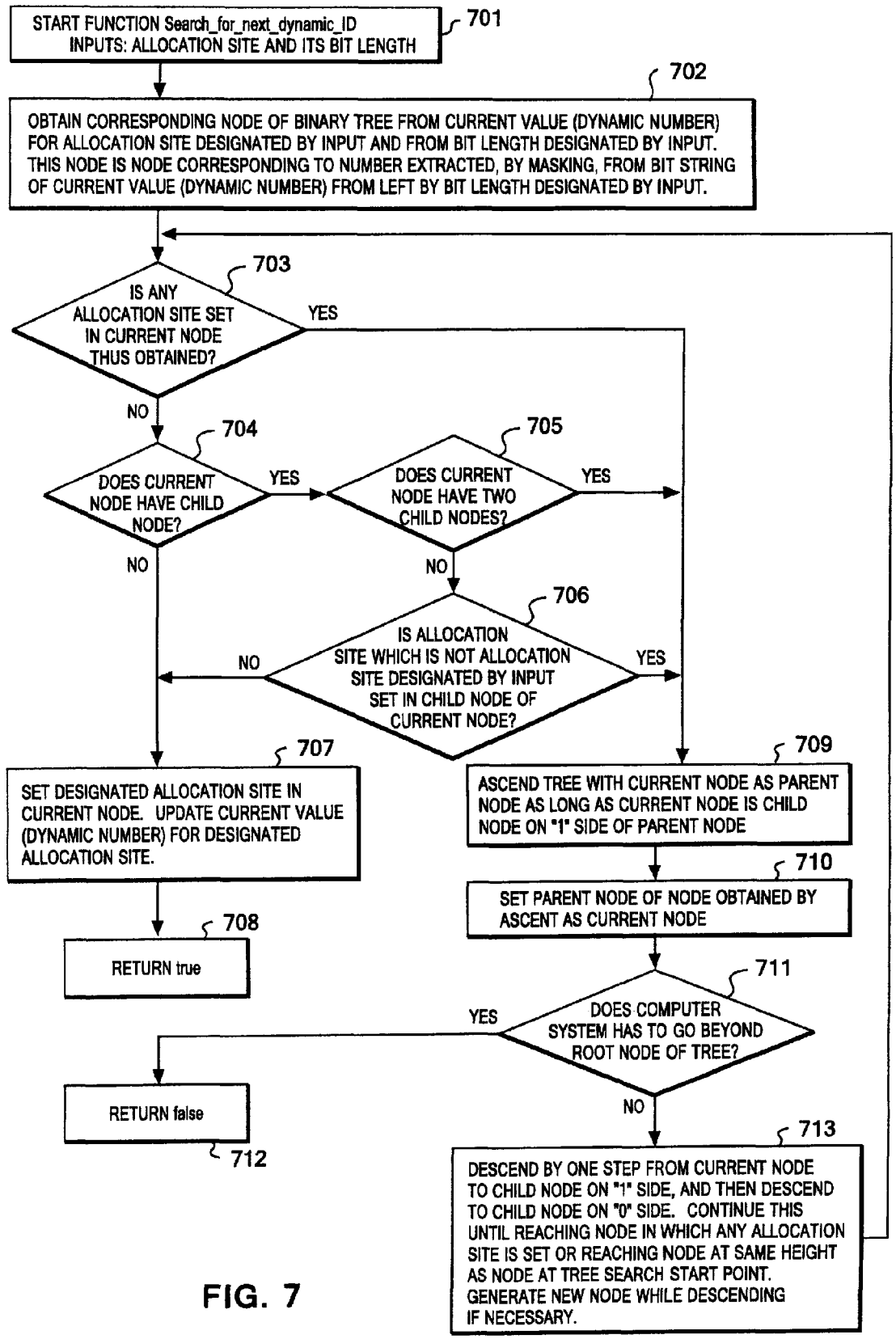
FIG. 7 is a flowchart of processing of allocating a new value (dynamic number) having a designated bit length, to a designated allocation site, in the embodiment of the present invention.

FIG. 7 is a flowchart of processing of allocating a new value (dynamic number) having a designated bit length, to a designated allocation site, in the embodiment of the present invention.

A function used for implementing the flowchart returns true when the new value (dynamic number) has been successfully allocated, and returns false when the allocation has failed.

In Step 701, the computer system starts processing by calling the function in response to a request from a caller. Here, the name of the function used for executing the processing is "Search_for_next_dynamic_ID". The inputs for the function are an allocation site and the bit length of the allocation site.

In Step 702, the computer system obtains a corresponding node of a binary tree from a current value (dynamic number) for the allocation site designated by the input and from the bit length designated by the input. This node is a node corresponding to a number extracted, by masking, from the bit string of the current value (dynamic number) from the left by the bit length designated by the input. In response to the node being obtained, the processing proceeds to Step 703.

In Step 703, the computer system determines whether any allocation site is set in the current node thus obtained. If an allocation site is being set, the processing proceeds to Step 709. When no allocation site is being set, the processing proceeds to Step 704.

In Step 704, the computer system determines whether the current node has a child node. If the node has a child node, the processing proceeds to Step 705. If the node has no child node, the processing proceeds to Step 707.

In Step 705, the computer system determines whether the current node has two child nodes. If the current node has two child nodes, the processing proceeds to Step 709. If the current node does not have two child nodes, the processing proceeds to Step 706.

In Step 706, the computer system determines whether or not an allocation site which is not the allocation site designated by the input is set in the child node of the current node. If an allocation site which is not the designated allocation site is set, the processing proceeds to Step 709. If an allocation site which is the same as the designated allocation site is set, the processing proceeds to Step 707.

In Step 707, the computer system sets the allocation site designated by the input, in the current node. Further, the computer system updates the current value (dynamic number) for the allocation site designated by the input. After completion of the update, the processing proceeds to Step 708.

In Step 708, the function ends. In Step 708, the computer system returns true indicating success of the function, to the caller of the function, and the processing ends.

In Step 709, the computer system ascends the tree with the current node as a parent node as long as the current node is a child node on the "1" side of the parent node. In the binary tree used in the embodiment of the present invention, each branch is represented with a bit of 1 or 0. A child node on the "1" side of the parent node is a child node connected to the parent node with a branch represented with a bit of 1, as seen from the parent node. If the current node is a child node on the "1" side of the parent node, the computer system sets the parent node as the current node, and recursively ascends the branch of "1". The ascent is repeated until the current node is not a child node connected to the parent node with a branch represented with a bit of 1, as seen from the parent node. As the repetition ends, the processing proceeds to Step 710.

In Step 710, the computer system sets the parent node of the current node obtained by the ascent as the current node. After the setting of the current node, the processing proceeds to Step 711. Note that the processing for a case where the parent node does not exist is performed in the next step, Step 711.

In Step 711, the computer system determines whether the computer system has to go beyond the root node of the tree to obtain the parent node in Step 710. If the determination leads to a result that the computer system has to go beyond the root node of the tree, the processing proceeds to Step 712. If the computer system does not have to go beyond the root node of the tree, the processing proceeds to Step 713.

In Step 712, the computer system returns false indicating failure of the function to the caller of the function. Then, the processing ends.

In Step 713, the computer system descends the tree by one step from the current node determined in Step 710 to the child node on the "1" side, and then descends to the child node on the "0" side. The descent is continued until reaching a node in which any allocation site is set or reaching a node at the same height as the node at the tree search start point. Here, the node at the tree search start point is the node obtained in Step 702. Moreover, when there is no child node on the "0" side and a new node is needed at the descent, the computer system generates a new node to add it to the binary tree. After completion of the descent, the processing returns to Step 703.

FIGS. 8A to 8F show examples of program code for implementing the embodiment of the present invention. Note that these program codes are merely examples, and the present invention is not limited to them.

FIG. 8A shows an example of a program to implement constant-value definition for the hash-value field shown in FIG. 2B, in the embodiment of the present invention.

A program code (801) shows an implementation example in which one word is 32 bits and 14 higher-order bits are used for the hash-value field.

In the program code (801), the bit length of the hash-value field is defined to be 14. The bit length of bits for saving the object identifier is defined to be 4 to 14 bits. The maximum bit length of bits for saving a value corresponding to an allocation site is defined to bit length (10 bits) obtained by subtracting a minimum bit length (4 bits) of the bit length of the bits for saving the object identifier, from the bit length of the hash-value field (14 bits). A bit for saving a reference flag is set in the 18th bit. Note that the program code (801) shows an example in which the reference flag is not included in the hash-value field.

FIG. 8B shows an example of a program to implement the data structure shown in FIG. 2A, in the embodiment of the present invention.

A program code (802) shows an example in which the object shown in FIG. 2A is represented as a structure.

A program code (803) shows an example of a structure for saving information on each allocation site. In the structure, information necessary for each allocation site is saved, such as a value (dynamic number) and the bit length of an object identifier.

FIG. 8C shows an example of a program to implement a data structure related to the binary tree in FIG. 6B, in the embodiment of the present invention.

A program code (804) shows an example in which a node of the binary tree shown in FIG. 6B is represented as a structure. Information necessary for each node is saved in the structure, such as a value (static number), a value (dynamic number), and a relation to another node.

A program code (805) shows an example of a structure for managing the binary tree shown in FIG. 6B. The structure is provided for each class, and in the structure, information on the binary tree is saved, such as exclusive control and a root node.

FIGS. 8D to 8F show an example of a program to implement incorporation of an algorithm for rewriting the hash-value field from a value (static number) to a value (dynamic number), in the function shown in FIG. 4B for referring to a hash value, in the embodiment of the present invention.

In this function, a hash value is returned to the caller, and if the hash value is referred to for the first time, the hash-value field is rewritten from a value (static number) to a value (dynamic number). This rewrite needs to be done atomically.

Figure 9A:
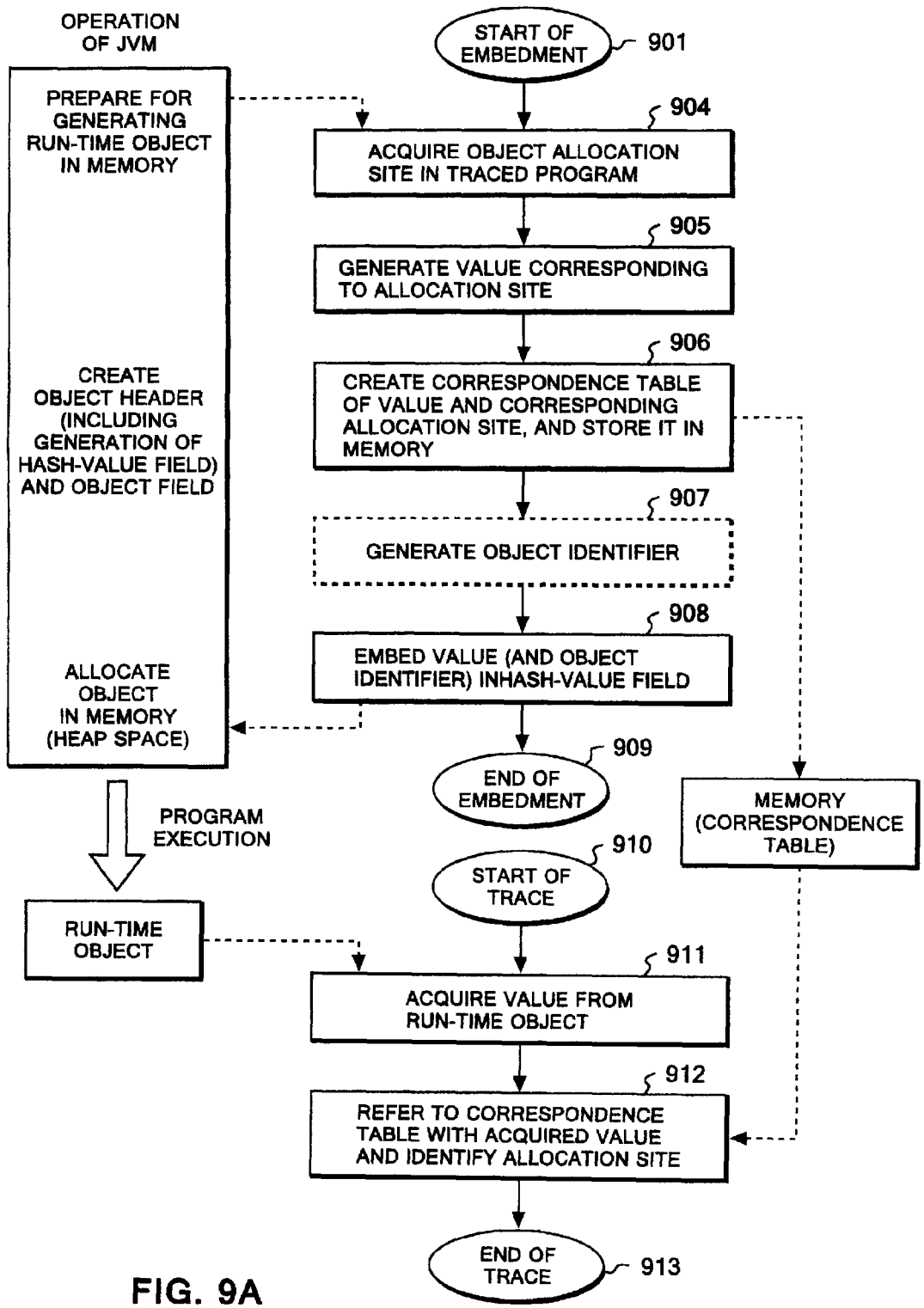
FIG. 9A is a flowchart of a method for generating a data structure of a run-time object in which a value (static number) is embedded, and a method for tracing an object allocation site in a program, using the generated data structure, in the embodiment of the present invention.
Figure 9B:
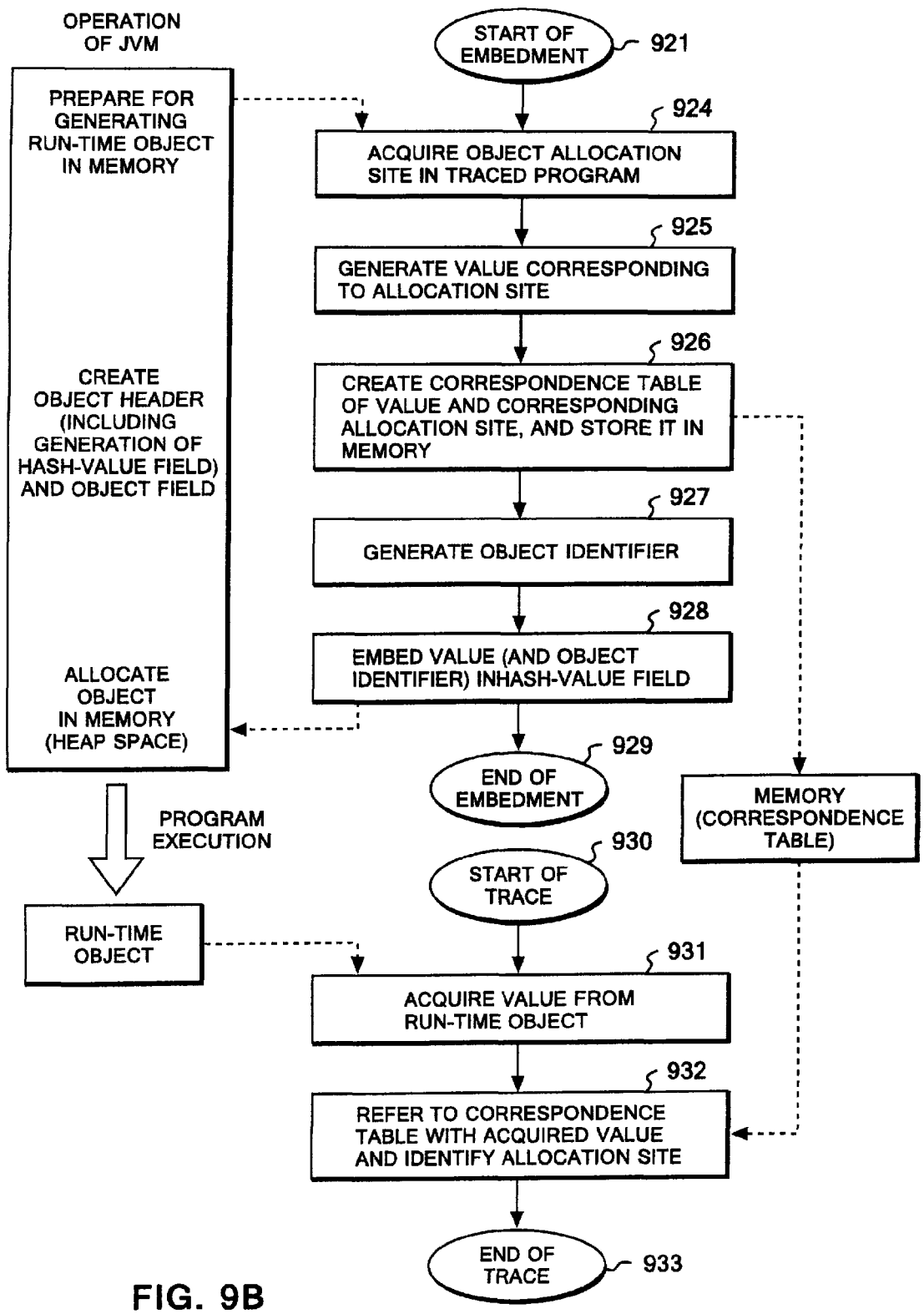
FIG. 9B is a flowchart of a method for generating a data structure of a run-time object in which a value (dynamic number) is embedded, and a method for tracing an object allocation site in a program, using the generated data structure, in the embodiment of the present invention.

FIG. 9B is a flowchart of a method for creating a data structure of a run-time object in which a value (static number) is embedded, and a method for tracing an object allocation site in a program, using the created data structure, in the embodiment of the present invention.

In Step 901, the computer system starts a method for embedding a value (static number) corresponding to an object allocation site, in the hash-value field of a run-time object. The method is started upon the start of creation of the run-time object in response to the object allocation in the program in an execution environment, e.g., JVM.

In Step 904, the computer system acquires an object allocation site in the program through, for example, a compiler.

In Step 905, the computer system generates a value (static number) corresponding to the allocation site if a value (static number) corresponding to the allocation site has not been generated yet. This value (static number) has a fixed bit length smaller than the bit length of the hash-value field.

In Step 906, the computer system stores, in memory, a correspondence table recording a correspondence between the value (static number) and the allocation site corresponding to that value (static number). Note that the correspondence table is unnecessary if a line number itself in the program is used as the allocation site.

In Step 907, the computer system generates an object identifier. The object identifier may be generated by any selected method. For example, an address to which the run-time object is to be allocated may be used as the object identifier.

In Step 908, the computer system embeds the value (static number) and the object identifier in the hash-value field of the run-time object.

In Step 909, the computer system ends the embedment. Then, the run-time object having a desired data structure is generated in an execution environment, e.g., JVM, and allocated in memory.

In Step 910, the computer system starts tracing the object allocation site in the program. The computer system executing the program starts the trace upon receipt of a command to start tracing during or after the program execution.

In Step 911, the computer system acquires the embedded value (static number) from the hash-value field of a run-time object remaining in the heap space.

In Step 912, the computer system refers to the correspondence table and thereby identifies the object allocation site corresponding to the acquired value (static number).

Steps 911 and 912 are performed on all the remaining run-time objects. Steps 911 and 912 may be performed on a run-time object designated by a user. The computer system displays, on a screen, the correspondence between an object and its corresponding allocation site identified in the above way, or outputs the correspondence as a file.

In Step 913, the computer system ends the trace.

Note that the correspondence table used in Step 906 is unnecessary if the value (static number) acquired in Step 905 is a line number itself. Further, in Step 907, instead of generating the object identifier, a value represented with bits which have not been replaced with the value (static number), out of the bits representing the hash value generated in the execution environment, may be used as the object identifier.

FIG. 9B is a flowchart of a method for creating a data structure of a run-time object in which a value (dynamic number) is embedded, and a method for tracing an object allocation site in a program, using the created data structure, in the embodiment of the present invention.

In Step 921, the computer system starts a method for embedding a value (dynamic number) corresponding to an object allocation site in the hash-value field of a run-time object. The method is started upon the start of creation of the run-time object in response to the object allocation in the program in an execution environment, e.g., JVM.

In Step 924, the computer system acquires an object allocation site in the program through, for example, a compiler.

In Step 925, the computer system generates a value (dynamic number) corresponding to the allocation site if a value (dynamic number) corresponding to the allocation site is not recorded in a correspondence table or if the bit length of a value (dynamic number) is to be changed for the same allocation site. This value (dynamic number) has a bit length smaller than the bit length of the hash-value field. The bit length for the value (dynamic number) generated first is set to be relatively large. Then, as the number of the same objects allocated at the same allocation site increases, the bit length of the value (dynamic number) is set to be smaller and smaller.

In Step 926, the computer system stores, in memory, a correspondence table recording a correspondence between the value (dynamic number) and the allocation site corresponding to that value (dynamic number). Note that, every time the bit length of the value (dynamic number) is set to be smaller, the correspondence table is created so that multiple values (dynamic numbers) may correspond to the same allocation site.

In Step 927, the computer system generates an object identifier. The object identifier may be generated by any selected method. For example, an address to which the run-time object is to be allocated may be used as the object identifier.

In Step 928, the computer system embeds the value (dynamic number) and the object identifier in the hash-value field of the run-time object.

In Step 929, the computer system ends the embedment. Then, the run-time object having a desired data structure is generated in an execution environment, e.g., JVM, and allocated in memory.

In Step 930, the computer system starts tracing the object allocation site in the program. The computer system executing the program starts the trace upon receipt of a command to start tracing during or after the program execution.

In Step 931, the computer system acquires the embedded value (dynamic number) from the hash-value field of a run-time object remaining in the heap space.

In Step 932, the computer system refers to the correspondence table and thereby identifies the object allocation site corresponding to the acquired value (dynamic number).

Steps 931 and 932 are performed on all the remaining run-time objects. Steps 931 and 932 may be performed on a run-time object designated by a user. The computer system displays, on a screen, the correspondence between an object and its corresponding allocation site identified in the above way, or outputs the correspondence as a file.

In Step 933, the computer system ends the trace.

Figure 9C:
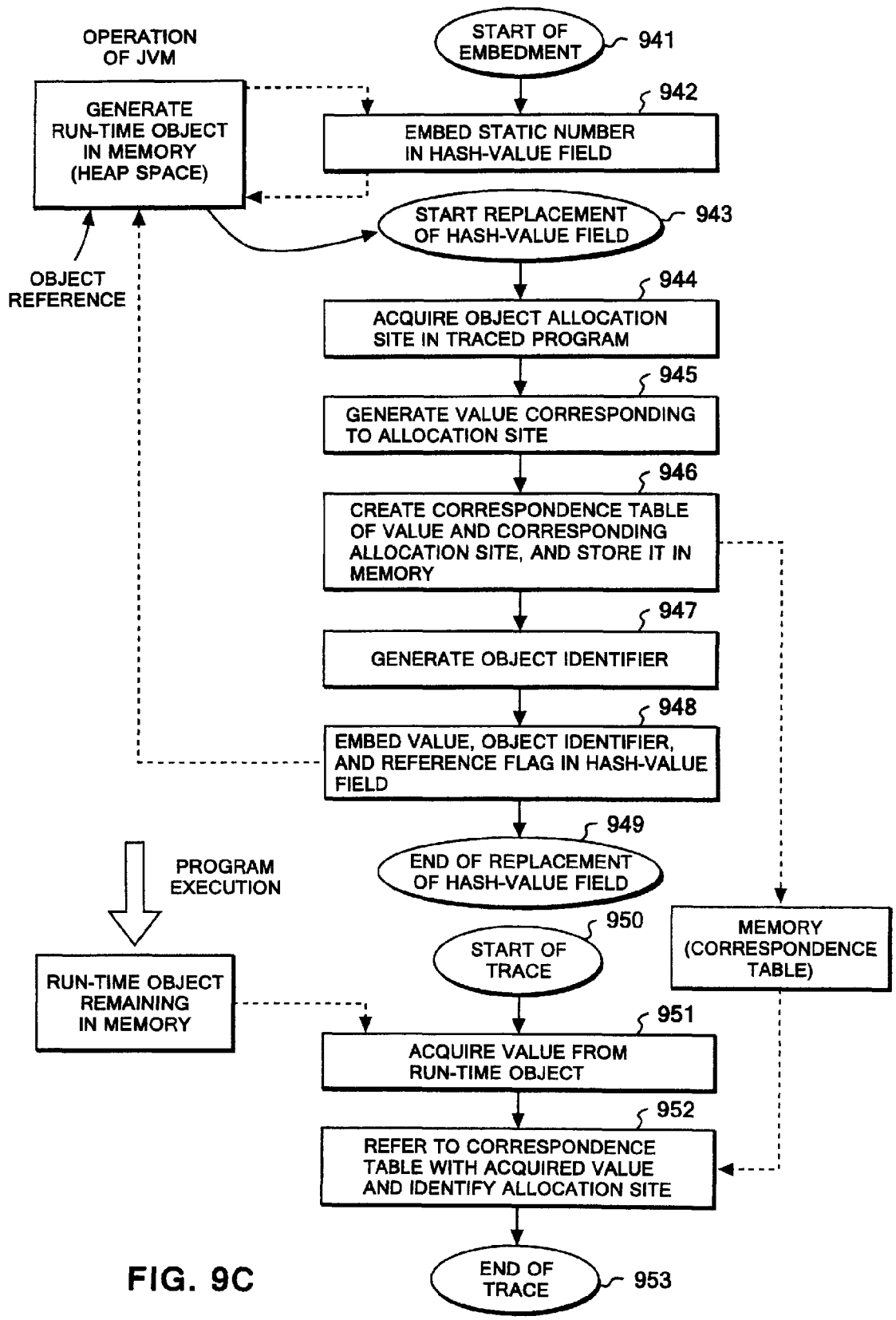
FIG. 9C is a flowchart of a method for generating a data structure of a run-time object by using both a value (static number) and a value (dynamic number), and a method for tracing an object allocation site, using the generated data structure, in the embodiment of the present invention.

FIG. 9C is a flowchart of a method for creating a data structure of a run-time object by using both a value (static number) and a value (dynamic number), and a method for tracing an object allocation site, using the created data structure, in the embodiment of the present invention.

In Step 941, the computer system starts a method for embedding a value (static number) corresponding to an object allocation site, in the hash-value field of a run-time object. The method is started upon the start of creation of the run-time object in response to the object allocation in the program in an execution environment, e.g., JVM.

In Step 942, the computer system executes processing of Steps 904 to 906 in FIG. 9A. Then, the computer system embeds a value (static number) and a reference flag in the hash-value field. Thereafter, a run-time object is generated in an execution environment, e.g., in the Java language, and is allocated at memory.

In Step 943, in response to the generated object being referred to for the first time, the computer system starts an operation of replacing the hash-value field of that object.

In Step 944, the computer system acquires a value (static number) held in the hash-value field of the replacement-target object.

In Step 945, the computer system generates a value (dynamic number) corresponding to an allocation site. This value (dynamic number) has a bit length smaller than that of the hash-value field. The bit length for a value (dynamic number) generated first is set to be relatively large. Then, as the number of the same objects allocated at the same allocation site increases, the bit length of the value (dynamic number) is set to be smaller and smaller.

In Step 946, the computer system stores, in memory, a correspondence table recording a correspondence between the value (dynamic number) and the allocation site corresponding to that value (dynamic number). Note that, every time the bit length of the value (dynamic number) is set to be smaller, the correspondence table is created so that multiple values (dynamic numbers) may correspond to the same allocation site.

In Step 947, the computer system generates an object identifier. The object identifier may be generated by any selected method. For example, an address to which the run-time object is to be allocated may be used as the object identifier.

In Step 948, the computer system embeds the value (dynamic number) and the object identifier in the hash-value field of the run-time object. Additionally, the computer system sets a reference flag in the hash-value field of the run-time object.

In Step 949, the computer system ends the embedment. Then, the run-time object having a desired data structure is generated in an execution environment, e.g., JVM, and is allocated in memory.

In Step 950, the computer system starts tracing the object allocation site in the program. The computer system executing the program starts the trace upon receipt of a command to start tracing during or after the program execution.

In Step 951, the computer system acquires the embedded value (dynamic number) from the hash-value field of a run-time object remaining in the heap space.

In Step 952, the computer system refers to the correspondence table and thereby identifies the object allocation site corresponding to the acquired value (dynamic number).

Steps 951 and 952 are performed on all the remaining run-time objects. Steps 951 and 952 may be performed on a run-time object designated by a user. The computer system displays, on a screen, the correspondence between an object and its corresponding allocation site identified in the above way, or outputs the correspondence as a file.

In Step 953, the computer system ends the trace.

In the embodiment of the present invention, the computer system can collect the value (static number) or the value (dynamic number) to reuse it. A description is given below of a reuse procedure.

The computer system scans the heap space periodically. The scan may be carried out in response to, for example, execution of garbage collection. The computer system can decrease the system load by carrying out the scan in response to the garbage collection. In addition, the scan may be performed solely on an object allocated at an infrequently-executed allocation site on program code.

In the scan, the computer system acquires a value (static number) and a value (dynamic number) corresponding to an allocation site in which all the allocated objects are dead. Instead, the computer system may acquire a value (static number) corresponding to an allocation site in which a value (dynamic number) is embedded in all the allocated objects.

For example, the computer system records the acquired value (static number) and value (dynamic number) in a correspondence table.

When a run-time object is allocated at a new allocation site, the computer system may use the recorded value (static number) as a value (static number) corresponding to the new allocation site.

In addition, when the hash value of the run-time object is referred to in the new allocation site, the computer system may use the recorded value (dynamic number) as a value (dynamic number) corresponding to the new allocation site.

When a new object is allocated using the acquired value (static number) or an allocation site corresponding to the value (static number), the computer system allocates a new value (static number) or a special value indicating "others" to the allocation site corresponding to the acquired value (static number). For example, the computer system records the allocated value in a correspondence table.

Moreover, when the hash value of an object newly allocated at the allocation site corresponding to the acquired value (dynamic number) is referred to, the computer system allocates a new value (dynamic number) or a special value indicating "others" to the allocation site corresponding to the acquired value. For example, the computer system records the allocated value in a correspondence table.

When there is no more usable values (static numbers), the computer system may re-allocate values (static numbers) so that allocation sites in the same method may have the same value (static number), and rewrite the value (static number) embedded in the object header to the same value (static number) thus re-allocated.

FIG. 10 shows an output example of a result of tracing an object allocation site, shown in FIGS. 9A to 9C, in the embodiment of the present invention.

Assume that a bug has been found, in which a used amount in the heap space keeps increasing infinitely when a certain program is executed. The output example of FIG. 10 is a list, displayed at a certain point in the execution of the certain program, of memory addresses of run-time objects in the heap space with their allocation sites in the program. For example, a site where the most objects are allocated can be seen from the output. In this output example, it can be seen that there are so many objects allocated at a line number 128 of a method meth2. Thereby, it is presumed that the bug in which the used amount in the heap space keeps increasing infinitely, for example, is very likely to be caused by the line number 128 of the method meth2. In this way, the cause of bugs can be found by allowing an object allocation site to be traceable, and thereby a higher reliability of the program can be obtained.

FIG. 11 shows static numbers, for each class, of allocation sites in two applications (Trade6 and SPECjbb2005), in the embodiment of the present invention.

The following experiment was conducted using a simulator in which the method shown in FIGS. 9A to 9C was implemented.

In the experiment, tracing of an allocation site of a run-time object and tracing of a call of java.lang.Object.hashCode( ) were performed using the JVMTI (Java Virtual Machine Tool Interface) in the Java virtual machine (Java VM). Note that a call of java.lang.System.identityHashCode( ) was not traced. In addition, a call of an object of a class that overrides hashCode( ) e.g., java.lang.String and java.lang.Integer, was precluded from the tracing targets. Next, a trace was inputted to the simulator to check the number of allocation sites and the number of hash-value collisions according to the embodiment of the present invention. The implementation used in the experiment is a similar to the pseudo code shown above, except that a new value (dynamic number) is allocated at the time when the lower half of bits representing the object identifier become 0. In addition, the number of collisions was checked for a case of using a 15-bit-length random value as a hash value and for a case of using a value (static number) as it is as a hash value. The following cases were checked: a case in which the application SPECjbb2005 was run with 1 warehouse for two minutes, and a case in which the application Trade6 was run with application of a load for two minutes since the activation of WebSphere Application Server 6.1.

The numbers shown in FIG. 11 are numbers of allocation sites in bytecode, and do not include numbers of sites to which a String literal or the like is allocated in JVM. An object class array in Trade6 has the most numbers of allocation sites, specifically, 14933 sites. This value can be represented with 14 bits, and therefore, values (static numbers) did not overflow in this experiment.

FIG. 12 shows the mean number and the maximum number of hash-value collisions in the two applications (Trade6 and SPECjbb2005) used in FIG. 11, in the embodiment of the present invention.

The number of collisions is the number of objects having the same, certain hash value. When all objects have different hash values, the number of collisions is 1. Since it is unlikely in an actual program that hash values of objects of different classes are compared to each other, the collision was checked only among objects of the same class in the this experiment. Moreover, since the survival time of objects were not considered, the collisions occurred among dead objects were also counted. As seen from the experiment result shown in FIG. 12, the collisions according to the embodiment of the present invention are few enough to show usefulness of the present invention.

In the experiment, in Trade6, there were 15 cases in which a new dynamic number could not be allocated. In all of these failed cases, a new dynamic number was attempted to be allocated to an allocation site to which some value (dynamic number) had already been allocated. As shown in the program in FIGS. 8A to 8F, in such failed cases, an already-allocated value (dynamic number) continues to be used, so that no ambiguity occurs in the allocation site information.

FIGS. 13A to 13D are functional-block diagrams illustrating functions of the computer system executing the processing shown in FIGS. 4B, 7, and 9A to 9C, in the embodiment of the present invention.

Figure 13A:
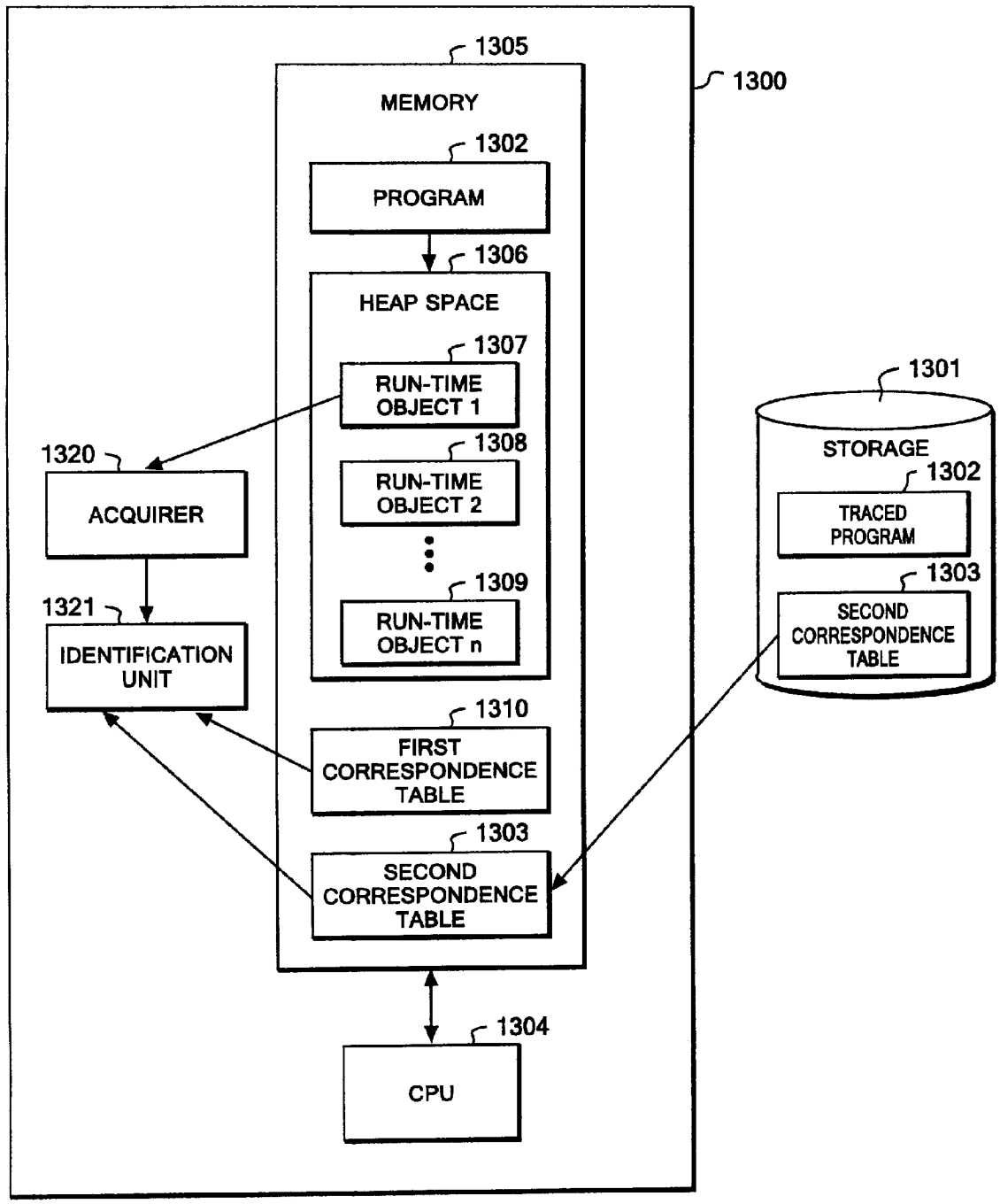
FIG. 13A is a functional-block diagram illustrating functions of the computer system executing program-tracing processing shown in FIGS. 9A to 9C, in the embodiment of the present invention.

FIG. 13A is a functional-block diagram illustrating functions of the computer system executing program-tracing processing shown in FIGS. 9A to 9C, in the embodiment of the present invention.

The computer system (1300) includes storage (1301), a CPU (1304), a memory (1305), an acquirer (1320), and an identification unit (1321). The storage (1301) may be provided either inside or outside the computer system (1300). Moreover, the storage (1301) may be a storage device on a network connected to the computer system (1300) or may be a storage device in another computer system. The storage (1301) stores a traced program (1302). The storage (1301) may store a second correspondence table (1303).

The CPU (1304) executes the tracing processing shown in FIGS. 9A to 9C. If the second correspondence table (1303) is stored in the storage (1301), the CPU (1304) reads the second correspondence table (1303) into the memory (1305) in response to the execution of the tracing processing.

The memory (1305) includes a heap space (1306). The memory (1305) holds the traced program (1302) read from the storage (1301) and, optionally, a first correspondence table (1310) and the second correspondence table (1303). In the heap space (1306), run-time objects (1307 to 1309) are allocated by the traced program (1302) read into the memory (1305).

The acquirer (1320) acquires a value corresponding to an object allocation site in the program, from the hash-value field of each of the run-time objects (1307 to 1309).

The identification unit (1321) identifies an allocation site from the acquired value. For the identification, the first correspondence table (1310), the second correspondence table (1303), or both may be used.

Figure 13B:
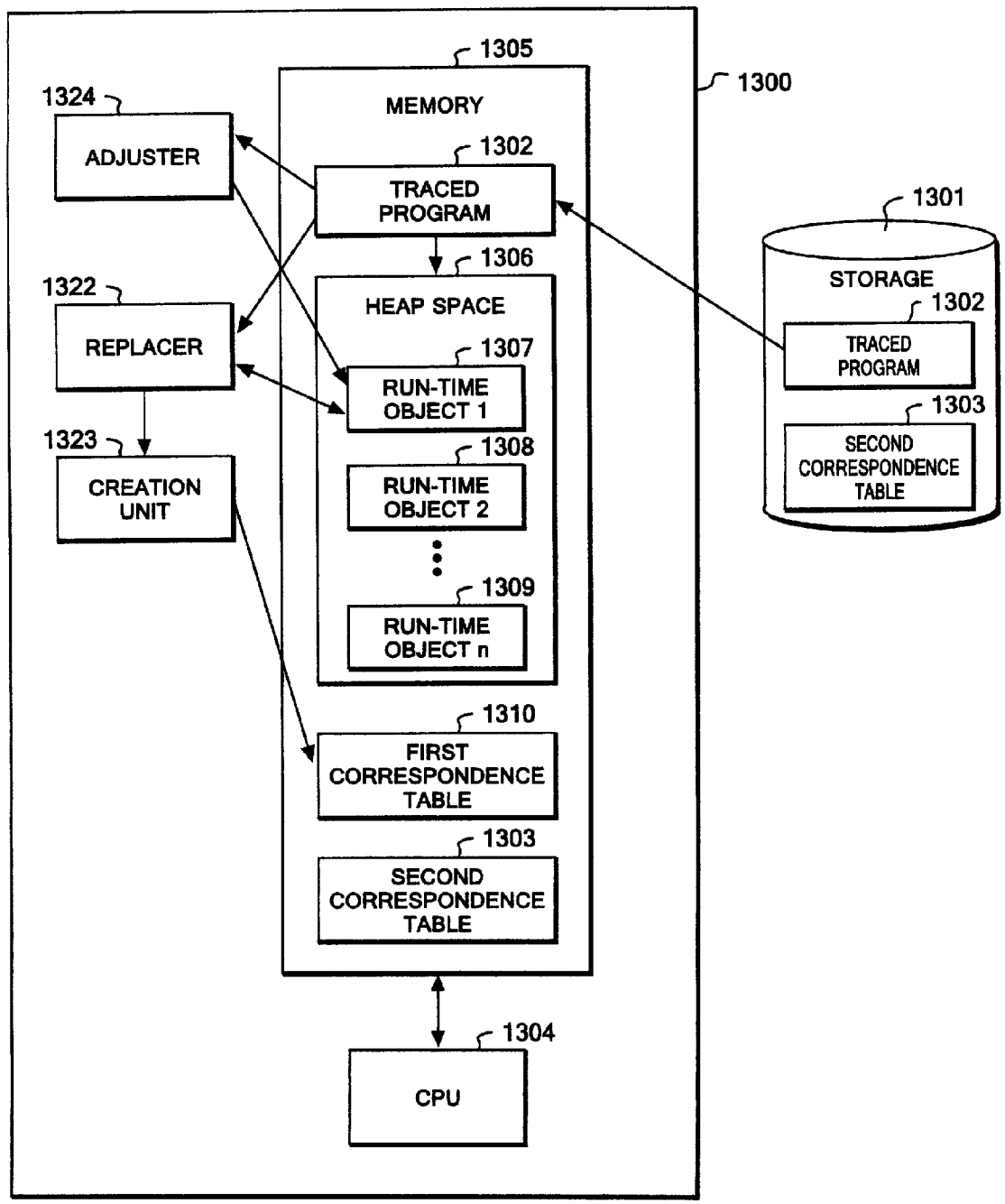
FIG. 13B is a functional-block diagram illustrating functions of the computer system executing processing, shown in FIG. 4B, FIGS. 7, and 9C, for replacing a value (static number) held in a hash-value field with a value (dynamic number), in the embodiment of the present invention.

FIG. 13B is a functional-block diagram illustrating functions of the computer system executing processing, shown in FIG. 4B, FIGS. 7, and 9C, for replacing a value (static number) held in a hash-value field with a value (dynamic number), in the embodiment of the present invention.

The functional blocks other than a replacer (1322), a creation unit (1323), and an adjuster (1324) are the same as those in FIG. 13A.

The CPU (1304) executes the processing shown in FIGS. 9B and 9C. The CPU (1304) reads the traced program (1302) from the storage (1301) into the memory (1305). The CPU (1304) executes the traced program (1302). In the heap space (1306), the run-time objects (1307 to 1309) are allocated in response to the execution of the traced program (1302).

The replacer (1322) replaces a value and an object identifier of any of the run-time objects (1307 to 1309) with a new value and with a new object identifier, in response to the first execution of a command to refer to a hash value of any of the run-time objects (1307 to 1309). Further, when the run-time objects (1307 to 1309) have reference flags, the replacer (1322) sets new reference flags.

The creation unit (1323) saves a correspondence between the value and the new value in the first correspondence table (1310).

When many run-time objects (1307 to 1309) are allocated at the same object allocation site in the program and when any of them is referred to for the first time, the adjuster (1324) makes small the bit length allocated to the values of the run-time objects (1307 to 1309) allocated at the same allocation site, and correspondingly makes large the bit length allocated to their object identifiers.

Figure 13C:
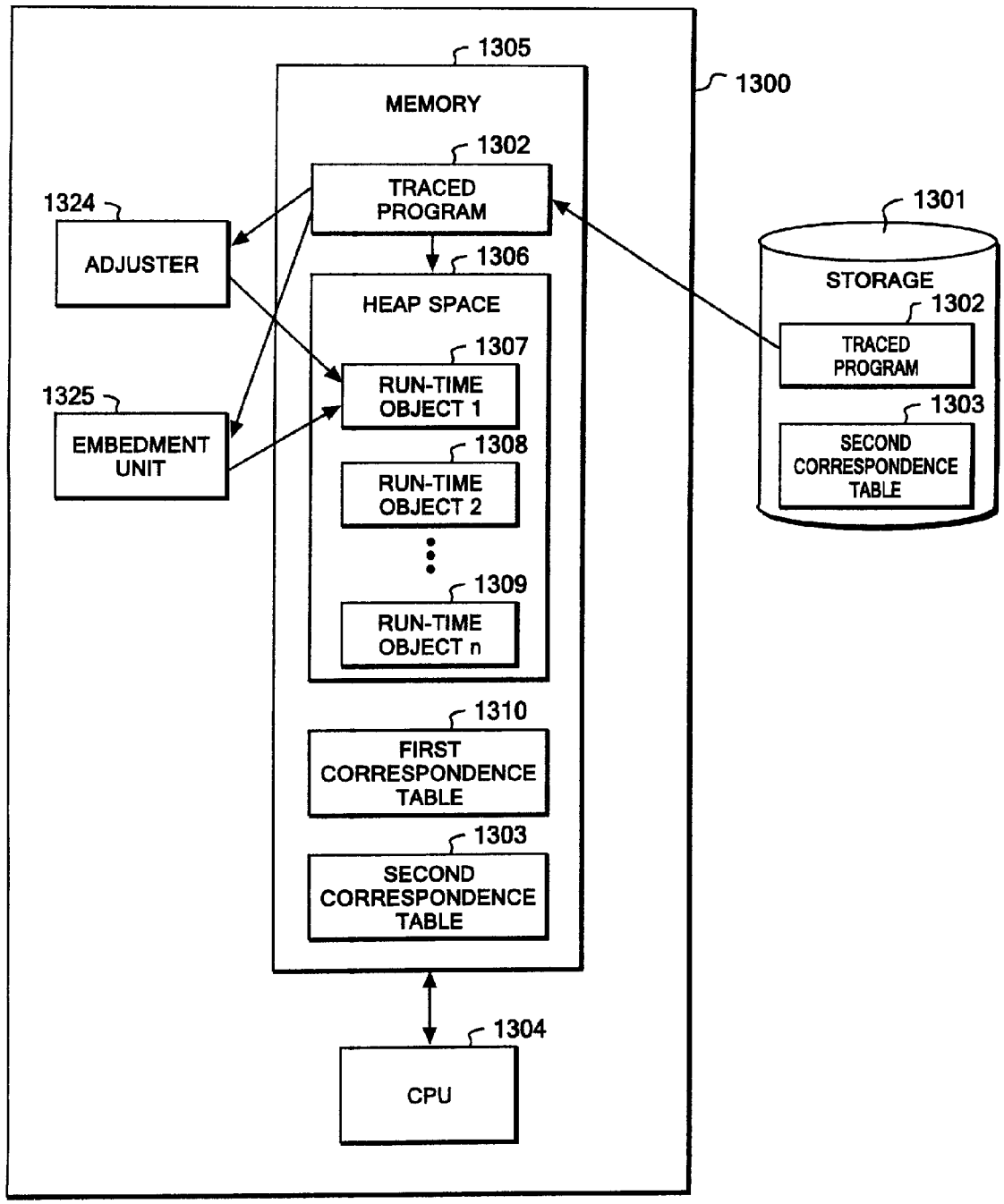
FIG. 13C is a functional-block diagram illustrating functions of the computer system executing the processing, shown in FIGS. 9A to 9C, of embedding a value (static number) in a hash-value field, in the embodiment of the present invention.

FIG. 13C is a functional-block diagram illustrating functions of the computer system executing the processing, shown in FIGS. 9A to 9C, of embedding a value (static number or dynamic number) in a hash-value field, in the embodiment of the present invention.

The functional blocks other than an embedment unit (1325) are the same as those of FIGS. 13A and 13B.

The CPU (1304) executes the processing shown in FIG. 9A. The CPU (1304) reads the traced program (1302) from the storage (1301) into the memory (1305). The CPU (1304) then executes the traced program (1302). In the heap space (1306), the run-time objects (1307 to 1309) are allocated in response to the execution of the traced program (1302).

In response to the run-time objects (1307 to 1309) being allocated in the memory (1305), the embedment unit (1325) embeds values corresponding to the object allocation site in the traced program (1302) and object identifiers, in the hash-value fields of the run-time objects (1307 to 1309). The embedment unit (1325) may further embed reference flags in the hash-value fields of the run-time objects (1307 to 1309).

When many run-time objects (1307 to 1309) are allocated at the same object allocation site in the program, the adjuster (1324) makes small the bit length allocated to the values of the run-time objects (1307 to 1309) allocated at the same allocation site, and correspondingly makes large the bit length allocated to their object identifiers.

Figure 13D:
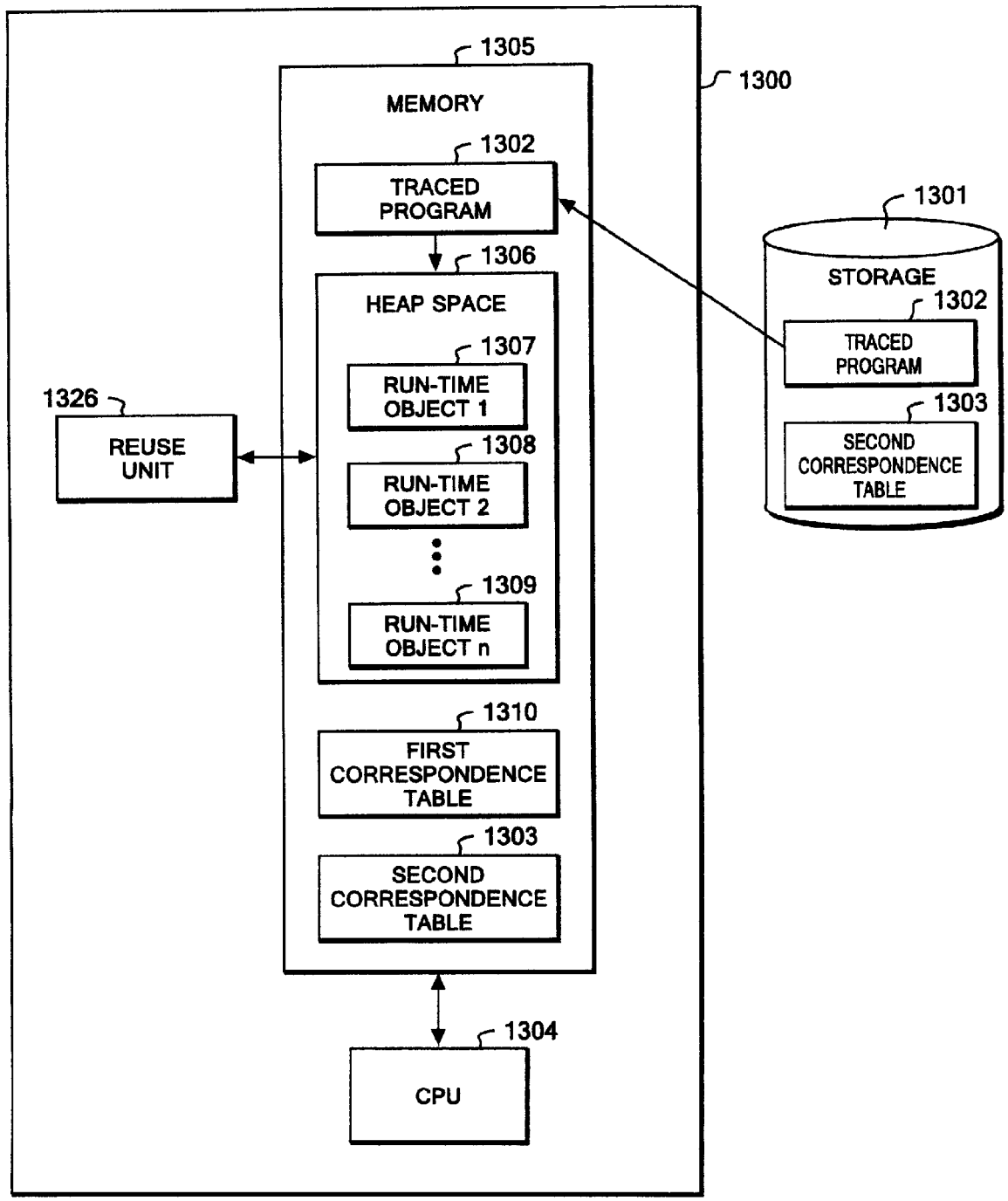
FIG. 13D is a functional-block diagram illustrating functions of the computer system executing processing of using a value of a hash-value field of a run-time object not being used, as a value for another run-time object, in the embodiment of the present invention.

FIG. 13D is a functional-block diagram illustrating functions of the computer system executing processing of using a value of a hash-value field of a run-time object not being used, as a value for another run-time object, in the embodiment of the present invention.

The functional blocks other than a reuse unit (1326) are the same as those in FIGS. 13A to 13C.

The CPU (1304) reads the traced program (1302) from the storage (1301) into the memory (1305). The CPU (1304) then executes the traced program (1302). In the heap space (1306), the run-time objects (1307 to 1309) are allocated in response to the execution of the traced program (1302). Here, assume that that the run-time object 1 (1307) is not being used. Further, assume that the run-time object 2 (1308) has no value in its hash-value field since there is no allocatable value.

The reuse unit (1326) scans the heap space (1306) and acquires a value of the hash-value field of the run-time object 1 (1307) not being used. The reuse unit (1326) embeds the acquired value in the hash-value field of the run-time object 2 (1308).

If more and more new values corresponding to an allocation site are allocated in the course of the execution, the bit length for a value (static number) or for a value (dynamic number) might become insufficient. To avoid this, the reuse unit (1326) may scan the heap space (1306) and thus check the numbers of infrequently-executed allocation sites, to collect and reuse a value (static number) or a value (dynamic number) of an allocation site having no live objects.

A value (dynamic number) is embedded in all the live run-time objects allocated at the same site. Accordingly, the reuse unit (1326) may collect values (static numbers) embedded in the run-time objects. The traced program has less overhead if the heap space scan is carried out with the garbage collection.

Figure 14:
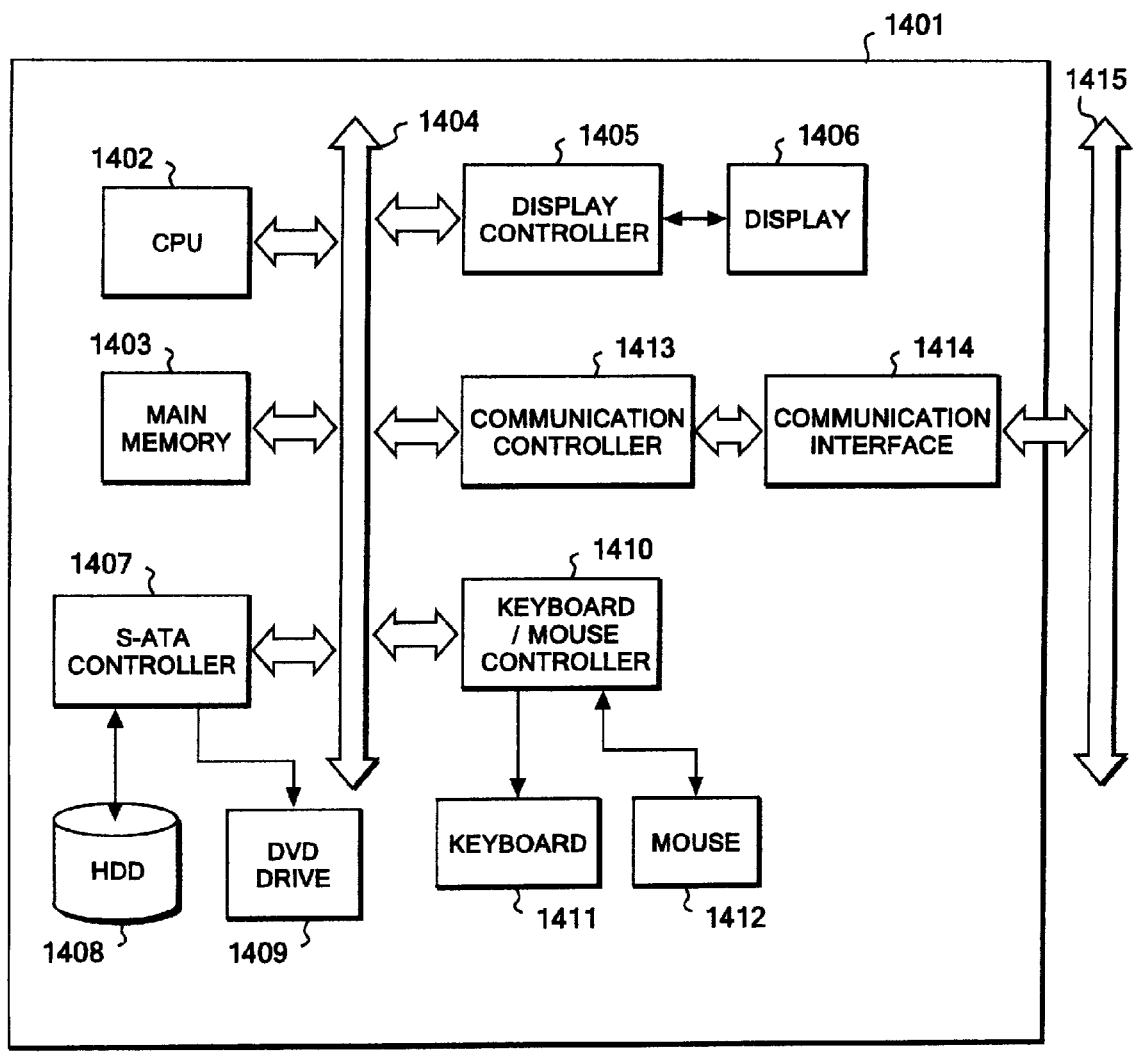
FIG. 14 shows a block diagram of computer hardware shown in FIG. 13, in the embodiment of the present invention.

FIG. 14 shows a block diagram of computer hardware shown in FIG. 13, in the embodiment of the present invention.

A computer system (1401) includes a CPU (1402) and a main memory (1403) which are connected to a bus (1404). The CPU (1402) is preferably based on a 32-bit or 64-bit architecture, and can employ, for example, Xeon series, Core series, Atom series, Pentium series, and Celeron series, of Intel Corporation, Phenom series, Athlon series, Turion series, and Sempron of Advanced Micro Devices, Inc, or the like. A display (1406), such as an LCD monitor, is connected to the bus (1404) through a display controller (1405). The display (1406) is used for the management of the computer system (1401) and displays, with an appropriate graphic interface, information on the computer system (1401) connected to a network through a communication line and information on software operating on the computer system (1401). A hard disk or silicon disk (1408) and a CD-ROM, DVD, or Blu-ray drive (1409) are further connected to the bus (1404) through an IDE or SATA controller (1407).

The hard disk (1408) stores an operating system, a program providing a Java processing environment, such as J2EE, and other programs and data in such a manner that they can be loaded onto main memory.

The CD-ROM, DVD, or Blu-ray drive (1409) is used, as needed, to introduce a program from a CD-ROM, a DVD-ROM, or a BD to the hard disk (1408). A keyboard (1411) and a mouse (1412) are further connected to the bus (1404) through a keyboard/mouse controller (1410).

A communication interface (1414) is in conformity with, for example, the Ethernet protocol, and is connected to the bus (1404) through a communication controller (1413). The communication interface (1414) plays a role of physically connecting the computer system (1401) to a communication line (1415), and provides a network interface layer to the TCP/IP communication protocol, being a communication function of the operating system of the computer system (1401). The communication line (1415) may be of a wired LAN environment, or of a wireless LAN environment which is based on wireless LAN connection standards, such as IEEE 802.11a/b/g/n.

Although preferred embodiments of the present invention have been described in detail, it should be understood that various changes, substitutions and alternations can be made therein without departing from spirit and scope of the invention as defined by the appended claims.

What is claimed is:

1. A computer implemented method comprising:
   allocating in a memory, from an object allocation site, a run-time object having a hash-value field comprising a hash value identifying the run-time object from among other run-time objects of a class, wherein the object allocation site is a site in a program allocating the run-time object;
   embedding into the hash-value field as at least a part of the hash value identifying the run-time object from among other run-time objects of a class, in response to allocating the run-time object, an allocation site identifier corresponding to the allocation site;
   acquiring the hash value from the hash-value field;
   determining the acquiring the hash-value is a first access of the hash-value field of the run-time object;
   generating, in response to determining the acquiring the hash-value field is the first access of the hash-value field, a first value that is unrelated to the allocation site;
   recording, into a first correspondence table in response to generating the first value, a correspondence between the first value and information identifying the allocation site;
   storing, in response to determining the acquiring the hash-value field is a first access of the hash-value field of the run-time object, the first value as a first component of the hash value; and
   identifying, in response to the acquiring and based on the hash value, the object allocation site based upon the first value and the correspondence, the identifying comprises obtaining, from the first correspondence table, the correspondence between the first value within the hash value acquired from the hash-value field of the run-time object, and information for identifying the allocation site that corresponds to the first value, thus identifying the allocation site that corresponds to the first value.

2. The method according to claim 1, wherein the generating the first value is based upon a binary tree structure of the first correspondence table.

3. The method according to claim 2, wherein:
   the binary tree structure shows a correspondence relationship between the first value and an allocation site that corresponds to the first value;
   each bit of the first value indicates a branch of the binary tree structure of the first correspondence table; and
   an indication of the object allocation site is stored as at least one node of the binary tree structure, the indication of the object allocation site being otherwise unrelated to the object allocation site.

4. The method according to claim 1, wherein:
   the identifying is based upon a second correspondence table that records a correspondence between a second value that is included in the hash-value field of a second run-time object, and the allocation site that corresponds to the second value, thus identifying the allocation site that corresponds to the second value.

5. A storage device having tangibly stored thereon or therein a computer program executable in a computer, the computer program, when executed, causing the computer to perform the method for tracing an object allocation site according to claim 1.

6. The method according to claim 1, wherein the hash-value field further comprises a reference flag, the reference flag having a first value upon allocation of the run-time object, and the reference flag having a second value that is different from the first value upon an accessing of the hash-value field, wherein the determining the accessing the hash-value field is the first access of the hash-value field of the run-time object is based upon determining the reference flag has the first value.

7. A computer implemented method comprising:
   allocating in a memory, from an object allocation site within a program, a run-time object having a hash-value field comprising a hash value identifying the run-time object from among other run-time objects of a class, wherein the object allocation site is a site in a program allocating the run-time object;
   embedding into the hash-value field as at least a part of the hash value identifying the run-time object from among other run-time objects of a class, in response to allocating the run-time object, an allocation site identifier corresponding to the allocation site, wherein the embedding comprises embedding a static identifier value directly identifying the allocation site within the class;
   replacing the static identifier value in the hash-value field with a calculated value in response to a determination of a first execution of a reference command that accesses the hash-value field of the run-time object,
   the calculated value comprising a first value being unrelated to the allocation site and the calculated value further comprising an allocated object identifier, separate from the first value, the allocated object identifier uniquely identifying objects allocated by the allocation site; and creating a correspondence table storing a correspondence between the first value and the allocation site.

8. The method according to claim 7, further comprising:
allocating a first bit length to the first value and allocating a second bit length to the allocated object identifier based upon a number of run-time objects allocated in the memory from the same object allocation site,
wherein the replacing the static identifier in the hash-value field comprises replacing the static identifier in the hash-value field with a combination of the calculated value having the first bit length and the allocated object identifier having the second bit length.

9. The method according to claim 8, further comprising determining that at least part of the bits of the allocated object identifier matches a predetermined bit pattern, and wherein the allocating further comprises changing the first bit length and the second bit length in response to determining that at least part of the bits of the allocated object identifier matches the predetermined bit pattern.

10. The method according to claim 7, the hash-value field further comprising a flag configured to be set to either of a first state or a second state,
the method further comprising setting the flag to the first state in response to the allocating and setting the flag to the second state in response to issuance of command accessing the hash-value field,
the determining the first execution of the reference command comprising determining, in response to issuance of the reference command, that the flag is in the first state.

11. The method according to claim 7, wherein the memory is a heap space of the memory, the method further comprising scanning the heap space, finding a value of the hash-value field of a run-time object not being used, and using the value of the hash-value field of the run-time object not being used for a new run-time object.

12. The method according to claim 11, wherein the scanning is performed through garbage collection.

13. The method according to claim 7, wherein a bit length allocated to the hash value is variable.

14. The method according to claim 7, wherein the hash-value field is in an object header of the run-time object.

15. A storage device having tangibly stored thereon or therein a computer program executable in a computer, the computer program, when executed, causing the computer to perform the method for allowing an object allocation site to be traced according to claim 7.

16. A computer system for tracing an object allocation site from a run-time object, the computer system comprising:
a memory that stores the run-time object;
an allocation unit configured to:
    allocate in the memory, from an object allocation site, a run-time object having a hash-value field comprising a hash value identifying the run-time object from among other run-time objects of a class, wherein the object allocation site is a site in a program allocating the run-time object; and
    embed into the hash-value field as at least a part of the hash value identifying the run-time object from among other run-time objects of a class, in response to allocating the run-time object, an allocation site identifier corresponding to the allocation site;
an acquirer configured to acquire the hash value from the hash-value field; and
an identification unit configured to:
    determine an acquiring the hash-value is a first access of the hash-value field of the run-time object;
    generate, in response to determining the acquiring the hash-value field is the first access of the hash-value field, a first value that is unrelated to the allocation site;
    record, into a first correspondence table in response to generating the first value, a correspondence between the first value and information identifying the allocation site;
    store, in response to a determination that the acquiring the hash-value field is a first access of the hash-value field of the run-time object, the first value as a first component of the hash value; and
    identify, in response to an allocation in the memory, the object allocation site based upon the first value and the correspondence, the identification unit further configured to identify by at least obtaining, from the first correspondence table, the correspondence between the first value within the hash value acquired from the hash-value field of the run-time object, and information for identifying the allocation site that corresponds to the first value, thus identifying the allocation site that corresponds to the first value.

17. A storage device having tangibly stored thereon or therein a computer program executable in a computer, which computer program, when executed, causes the computer to function as the computer system for tracing an object allocation site according to claim 16.

\* \* \* \* \*